US005576837A

United States Patent [19]
Strolle et al.

[11] Patent Number: 5,576,837
[45] Date of Patent: Nov. 19, 1996

[54] DIGITAL MODULATORS FOR USE WITH SUB-NYQUIST SAMPLING OF RASTER-SCANNED SAMPLES OF IMAGE INTENSITY

[75] Inventors: Christopher H. Strolle, Glenside, Pa.; Hermann J. Weckenbrock, Bordentown, N.J.

[73] Assignee: SamSung Electronics Co., Ltd., Kyungki-do, Rep. of Korea

[21] Appl. No.: 296,796

[22] Filed: Aug. 26, 1994

Related U.S. Application Data

[60] Division of Ser. No. 819,890, Jan. 13, 1992, Pat. No. 5,532,820, which is a continuation-in-part of Ser. No. 787,690, Nov. 4, 1991, which is a continuation-in-part of Ser. No. 635,197, Jan. 2, 1991, abandoned, which is a continuation-in-part of Ser. No. 569,029, Aug. 17, 1990, Pat. No. 5,113,262.

[51] Int. Cl.$^6$ .............................. H04N 9/79; H04N 7/12; H04N 11/04; H04N 11/02
[52] U.S. Cl. ............................ 386/33; 348/427; 386/109; 386/112
[58] Field of Search .................................... 358/310, 323, 358/330, 334, 329, 335, 342; 360/8, 9.1, 33.1, 29, 30; 348/427, 428, 429, 430, 431; H04N 5/76, 5/92, 5/78, 7/12, 11/02, 11/04, 9/79

[56] References Cited

U.S. PATENT DOCUMENTS

| | | |
|---|---|---|
| 3,700,793 | 10/1972 | Borsuk et al. |
| 3,939,303 | 2/1976 | Wise. |
| 4,168,509 | 9/1979 | Prichard et al. |
| 4,314,277 | 2/1982 | Hartman. |
| 4,626,803 | 12/1986 | Holm. |
| 5,027,222 | 6/1991 | Shinbo et al. |
| 5,031,030 | 7/1991 | Hurst. |
| 5,227,880 | 7/1993 | Kim. |
| 5,259,000 | 11/1993 | Kojima et al. |
| 5,386,235 | 1/1995 | Ko ............................................. 348/427 |

FOREIGN PATENT DOCUMENTS

| | | |
|---|---|---|
| 240209 | 10/1987 | European Pat. Off. |
| 471517A2 | 2/1992 | European Pat. Off. |
| 2219906 | 12/1989 | United Kingdom. |
| WO90/06631 | 6/1990 | WIPO. |

*Primary Examiner*—Thai Q. Tran
*Attorney, Agent, or Firm*—Robert E. Bushnell, Esq.

[57] ABSTRACT

Apparatus useful in electronics for the tape recording of a video signal, which is a baseband signal of a prescribed bandwidth extending up to a prescribed maximum frequency, processes the video signal to generate a folded-spectrum video signal. The video signal is digitized and supplied to a digital band-splitting filter with a cross-over frequency at one-half said prescribed maximum frequency, for separating the digitized video signal into samples of a lower-frequency-band component and into samples of a higher-frequency-band component. A balanced modulator is connected for modulating a folding carrier wave of the prescribed maximum frequency, which modulation is done in accordance with the higher-frequency-band component to generate a balanced modulation signal; and the balanced modulation signal is linearly combined with the lower-frequency-band component to generate the folded-spectrum video signal. Preferably, the sampling rate of the digitized video signal is exactly the Nyquist rate of the prescribed maximum frequency, reduces the balanced modulation of a suitably phased folding carrier wave to multiplication of successive samples of the modulating signal alternately by plus one and by minus one. Such multiplications are done without having to use a digital multiplier.

21 Claims, 15 Drawing Sheets

DIGITAL MODULATORS FOR USE WITH SUB-NYQUIST SAMPLING OF RASTER-SCANNED SAMPLES OF IMAGE INTENSITY

CROSS-REFERENCE TO RELATED APPLICATIONS

This divisional application makes reference to, incorporates herein and claims all benefits available under 35 U.S.C. §§120 and 121 of our applications entitled DIGITAL MODULATORS FOR USE WITH SUB-NYQUIST SAMPLING OF RASTER-SCANNED SAMPLES OF IMAGE INTENSITY earlier filed in the United States Patent & Trademark Office on 13 Jan.1992 and then assigned Ser. No. 07/819,890, now U.S. Pat. No. 5,532,820, which was, in turn, a continuation-in-part application of U.S. Ser. No. 07/787,690 entitled SYSTEM FOR RECORDING AND REPRODUCING A WIDE BANDWIDTH VIDEO SIGNAL VIA A NARROW BANDWIDTH MEDIUM filed in the U.S. Patent & Trademark Office on the 4th of Nov. 1991, which was a continuation-in-part application of U.S. Ser. No. 07/635,197 entitled FOLDING AND UNFOLDING OF ANALOG VIDEO SIGNALS USING DIGITAL PROCESSING filed in the U.S. Patent & Trademark Office on the 2nd of Jan. 1991, now abandoned, which was a continuation-in-part of U.S. Ser. No. 07/569,029 entitled AN IMPROVED VIDEO SIGNAL RECORDING SYSTEM filed in the U.S. Patent & Trademark Office on the 17th of Aug. 1990 and subsequently issued as U.S. Pat. No. 5,113, 262.

FIELD OF THE INVENTION

This invention pertains to digital synchronous modulators and, more particularly, to such modulators operated for sub-Nyquist sampling digital video signal descriptive of raster-scanned samples of image intensity, thereby to generate folded video signals of reduced bandwidth.

BACKGROUND OF THE INVENTION

Television systems have been proposed which use sub-Nyquist sampling of the luminance signal for obtaining increased resolution through frequency interleaving, while keeping the frequency spectrum occupied by the luminance information the same, and for achieving at the same time some degree of backward compatibility with existing television receivers. In sub-Nyquist sampling of a progressively scanned television signal, in a first set of alternate frames every odd sample in odd-numbered lines is replaced by a zero and every even sample in even-numbered lines is replaced by a zero; in a second set of alternate frames (interleaved in time with the first set) every even sample in odd-numbered lines is replaced by a zero and every odd sample in even-numbered lines is replaced by a zero, and the zero samples are not transmitted. Field-interlaced television signals can also be sub-Nyquist sampled. The sub-Nyquist sampling of a luminance signal of up to twice the bandwidth of a conventional broadcast luminance signal generates a "folded-luminance" signal with a bandwidth no more than that of a conventional broadcast luminance signal.

E. A. Howson and D. A. Bell describe frequency interleaving of luminance information in the analog domain in an article entitled "Reduction of Television Bandwidth By Frequency Interlace" in pages 127 through 136 of the February 1960 Journal of the British Institute of Radio Engineers. In one scheme envisioned by Howson et alii the entire luminance signal is used to amplitude-modulate a carrier having a frequency just above the highest frequencies in the luminance signal, and the resulting signal is supplied to a low-pass filter having a cut-off frequency at mid-band. In another scheme envisioned by Howson et alii the luminance signal is separated by a band-splitting filter into two components residing in respective ones of equal-bandwidth low-frequency and high-frequency bands, the high-frequency-band component is used to amplitude-modulate a carrier having a frequency just above the high-frequency band, and the lower sideband resulting from the amplitude modulation is combined with the low-frequency-band component to obtain a folded-luminance signal. Reducing television bandwidth by frequency interlace cannot be satisfactorily implemented in the analog domain, however, because of the difficulty of removing artifacts introduced by the frequency interleaving that manifest themselves as annoying dot crawl in the reconstructed full-band television image.

There have been proposals to use sub-Nyquist sampling of the luminance signal to improve home video cassette recorders (VCRs) using the VHS format. The VHS format is a color-under format. The chrominance information is recorded as in-phase and quadrature amplitude-modulated sidebands of a suppressed 629 kHz carrier, which is the fortieth harmonic of horizontal synchronization rate. The luminance information is recorded as frequency modulation of a carrier which can vary in frequency from 3.4 to 4.4 MHz (m 0.1 MHz), to occupy a 1.4–7.0 MHz band after filtering to suppress sideband energy below 1.4 MHz. The luminance and chrominance carriers are recorded and played back using helically scanning heads mounted in a rotating headwheel assembly, with these two components of video information being recorded on diagonal tracks. Stationary heads can be used for recording and playing back sound information recorded in lateral sound tracks on the video tapes. Alternatively, high-fidelity stereophonic sound can be recorded on and played back from deep diagonally recorded sound tracks by helical scanning procedures implemented by wide-gap heads also included in the rotating headwheel assembly. The high-fidelity stereophonic sound frequency-modulates a 1.2 MHz carrier.

One such modification of VHS format video tape recording was proposed by Faroudja in U.S. Pat. No. 4,831,463 issued 16 May 1989 and entitled "VIDEO PROCESSING IN WHICH HIGH FREQUENCY LUMINANCE COMPONENTS ARE FOLDED INTO A MID-BAND SPECTRUM". In the Faroudja video recording system (according to column 9, lines 10–35, of U.S. Pat. No. 4,831,463) the sub-Nyquist folding frequency is carefully chosen from amongst those frequencies which are precise harmonics of an odd multiple of both the line and frame scan rates of the baseband luminance. Faroudja performs sub-Nyquist sampling on the entire luminance signal, sampling at a folding clock frequency rate to generate a reversed frequency spectrum frequency-translated to baseband, there to interleave with the original frequency spectrum, and then applies the result to a low-pass filter cutting off at one-half the folding clock frequency to generate the folded-luminance signal. This procedure amplitude-modulates the folding clock frequency in a modulation procedure that—though it may be balanced with regard to suppressing the folding clock frequency—cannot be balanced with regard to modulating signal.

Another modification of VHS format video tape recording was briefly described by C. H. Strolle, J. W. Ko and Y. J. Kim in their paper "A Compatibly Improved VHS System" appearing on pages 122–123 of IEEE 1991 International Conference on Consumer Electronics Digest of Technical Papers for a conference held 5–7 June 1991 in Rosemont, Ill. This improved VHS video recording system is described in more detail in the U.S. patent application Ser. No. 787,690 filed by Christopher H. Strolle et alii, entitled "SYSTEM FOR RECORDING AND REPRODUCING A WIDE BANDWIDTH VIDEO SIGNAL VIA A NARROW BANDWIDTH MEDIUM" and assigned to Samsung Electronics. In this improved video recording system the sub-Nyquist folding carrier is chosen to be 320 times line scan rate, rather than one of the frequencies specified by Faroudja in U.S. Pat. No. 4,831,463.

To avoid generating aliasing artifacts that are intolerable to a person viewing a television image recovered from the video signal sampled at sub-Nyquist rate, before recording the luminance signal, the video recording system described in U.S. patent application Ser. No. 787,690 processes luminance as described immediately hereinafter. A band-splitting filter is used to separate a spatio-temporally filtered luminance signal into low-frequency-band and high-frequency-band spectra. The high-frequency-band spectrum is adaptively de-emphasized, or reduced in amplitude respective to the low-frequency-band spectrum.

If after its de-emphasis the high-frequency-band spectrum were re-combined with the low-frequency-band spectrum to generate a full-band luminance signal with de-emphasized high frequency content, the generation of folded-luminance signal from that full-band signal by the method Faroudja uses introduces a problem during playback with regard to restoring the de-emphasized high-frequency-band spectrum to its original amplitude respective to the low-frequency-band spectrum. This problem arises because, in addition to the roll-off of the lower frequencies of the high-frequency-band spectrum caused by the band-splitting filter used to separate the spatio-temporally filtered luminance signal into low-frequency-band and high-frequency-band spectra, there is an additional roll-off of the lower frequencies of the high-frequency-band spectrum caused by the low-pass filter used in generating the folded-luminance signal from the sub-Nyquist-sampled full-band signal.

This additional roll-off is avoided in the video recording system described in U.S. patent application Ser. No. 787,690 by applying the de-emphasized high-frequency-band spectrum to a balanced modulator, wherein that modulating signal is heterodyned with the folding carrier. The modulation procedure is one that suppresses modulating signal as well as folding clock frequency in the modulation result. The resulting balanced modulator output signal is a reversed spectrum frequency-translated to baseband and unaccompanied by the original spectrum of the modulating signal. This reversed spectrum, which encodes the de-emphasized high-frequency-band spectrum, has only the roll-off of the original band-splitting filter. There is an absence of significant spectral energy in the frequency range below the folding clock frequency occupied by the original de-emphasized high-frequency-band spectrum or in the mirrored frequency range above the folding clock frequency. Above the folding clock frequency there is also an absence of significant spectral energy in the mirror of that frequency range. That is, the balanced modulator output signal is free of first-harmonic (and all other odd-harmonic) sidebands of the folding clock frequency. The balanced modulator output signal is added to the low-frequency-band spectrum to generate a folded-luminance signal. It is then easy for one skilled in the art of filter design to design a low-pass filter for suppressing the even-harmonic sidebands of the folding clock frequency generated by the balanced modulator, while not introducing objectionable additional roll-off of the folded-luminance signal near the cross-over frequency of the band-splitting filter.

The folded-luminance signal is supplied as a modulating signal to a frequency modulator. A frequency-modulated luminance carrier generated by the frequency modulator is combined with a complex amplitude-modulation color-under carrier to generate a recording signal for the helically scanning video record head(s).

During playback the video recording system described in U.S. patent application Ser. No. 787,690 operates in the following manner. The frequency-modulated luminance carrier and the complex-amplitude-modulation color-under carrier in the playback signal recovered by the helically scanning video playback head(s) are separated from each other by respective band filters before each is demodulated. The folded-luminance signal is recovered by detecting the frequency modulation of the luminance carrier and then subjecting the detected folded-luminance signal to an unfolding procedure. In this procedure the folded-luminance signal is supplied as a modulating signal to a modulator, to be heterodyned with the folding carrier to restore its reversed spectrum portion to its original high-frequency band. This heterodyning procedure generates an undesirable image of the low-frequency band accompanying the high-frequency band in its portion of the spectrum. The low-frequency band, the restored high-frequency band and the high-frequency-band image of the low-frequency band are spatio temporally filtered to suppress the image, thus to recover the luminance signal with a de-emphasized high-frequency-band.

The de-emphasized high-frequency-band spectrum is separated from the low-frequency band by a band-splitting filter and re-emphasized to restore its original amplitude vis-a-vis the amplitude of the original baseband spectrum. It is this restoration step that would be hampered by roll-off of the lower frequencies of the high-frequency-band spectrum that is additional to that associated with the band-splitting filter used during recording. Such roll-off would tend to introduce a reduction in the amplitude of mid-spectrum frequencies.

The amplitude-restored high-frequency-band spectrum is then rejoined with the low-frequency band from which it was separated, thereby to recover a full-bandwidth replica of the wide-bandwidth luminance signal. This wide-bandwidth luminance signal, the chrominance signals demodulated from the complex-amplitude-modulation color-under carrier, and the sound signal recovered from the audio tape track are suitable for being encoded in substantial accordance with a broadcast color television standard and used to amplitude-modulate a broadcast-band carrier wave, thereby to generate signals suitable for application as input signals to a color television broadcast receiver. Alternatively, this wide-bandwidth luminance signal, the chrominance signals, and the sound signal may be supplied directly to a color television monitor, rather than being used to amplitude-modulate a broadcast-band carrier wave.

The generation of the folded video signal proceeding from a wide-bandwidth luminance signal and the regeneration of the wide-bandwidth luminance signal proceeding from the folded video signal are procedures best carried out in the digital, rather than analog, regime. Generally, a balanced modulator is realized in the digital regime as follows. A pair of four-quadrant digital multipliers are used for multiplying samples of a digitized modulating signal by samples of a first digitized carrier wave and by samples of a second digitized carrier wave opposite in phase to the first, and a digital adder combines the two digital products that result to generate the output signal of the balanced modulator. Digital multipliers that operate at video sample rates are expensive, taking up large areas on a monolithic integrated circuit. Such multipliers consume substantial power and so present problems with getting rid of the heat they generate.

Choosing the luminance sampling rate to be twice the folding carrier frequency in a folded-luminance signal employed in a video recording system causes the lower of the first-harmonic sidebands of the sampling frequency to fall into a frequency range immediately above the baseband spectrum. This would appear to interfere with the folding of the luminance spectrum. The high-luminance-frequency spectra in the baseband and in the lower first-harmonic sideband combine, however, to provide a frequency spectrum that is the equivalent of a band-pass filter response centered at the folding carrier frequency. A balanced modulator operated at folding carrier frequency responds to the band-pass filter response centered at the folding carrier frequency to generate an output signal in which the two high-luminance-frequency spectra fold together around zero frequency to form a reversed high-luminance-frequency spectrum, without the expected interference arising. Choosing the luminance sampling rate to be twice the folding carrier frequency in a folded-luminance signal employed in a video recording system reduces balanced modulation of a suitably phased folding carrier wave to multiplication of successive samples of the modulating signal alternately by plus one and by minus one. Such multiplications are done without having to use a digital multiplier.

SUMMARY OF THE INVENTION

Video signal, which is a baseband signal of a prescribed bandwidth extending up to a prescribed maximum frequency, is processed by apparatus embodying the invention to generate a folded-spectrum video signal. The video signal is digitized and supplied to a digital band-splitting filter with a cross-over frequency at one-half said prescribed maximum frequency, for separating the digitized video signal into samples of a lower-frequency-band component and into samples of a higher-frequency-band component. A balanced modulator is connected for modulating a folding carrier wave of the prescribed maximum frequency, which modulation is done in accordance with the higher-frequency-band component to generate a balanced modulation signal; and the balanced modulation signal is linearly combined with the lower-frequency-band component to generate the folded-spectrum video signal. In apparatus embodying the invention in a preferred form, the sampling rate of the digitized video signal is exactly the Nyquist rate of the prescribed maximum frequency, reduces the balanced modulation of a suitably phased folding carrier wave to multiplication of successive samples of the modulating signal alternately by plus one and by minus one. Such multiplications are done without having to use a digital multiplier.

Figure 1:
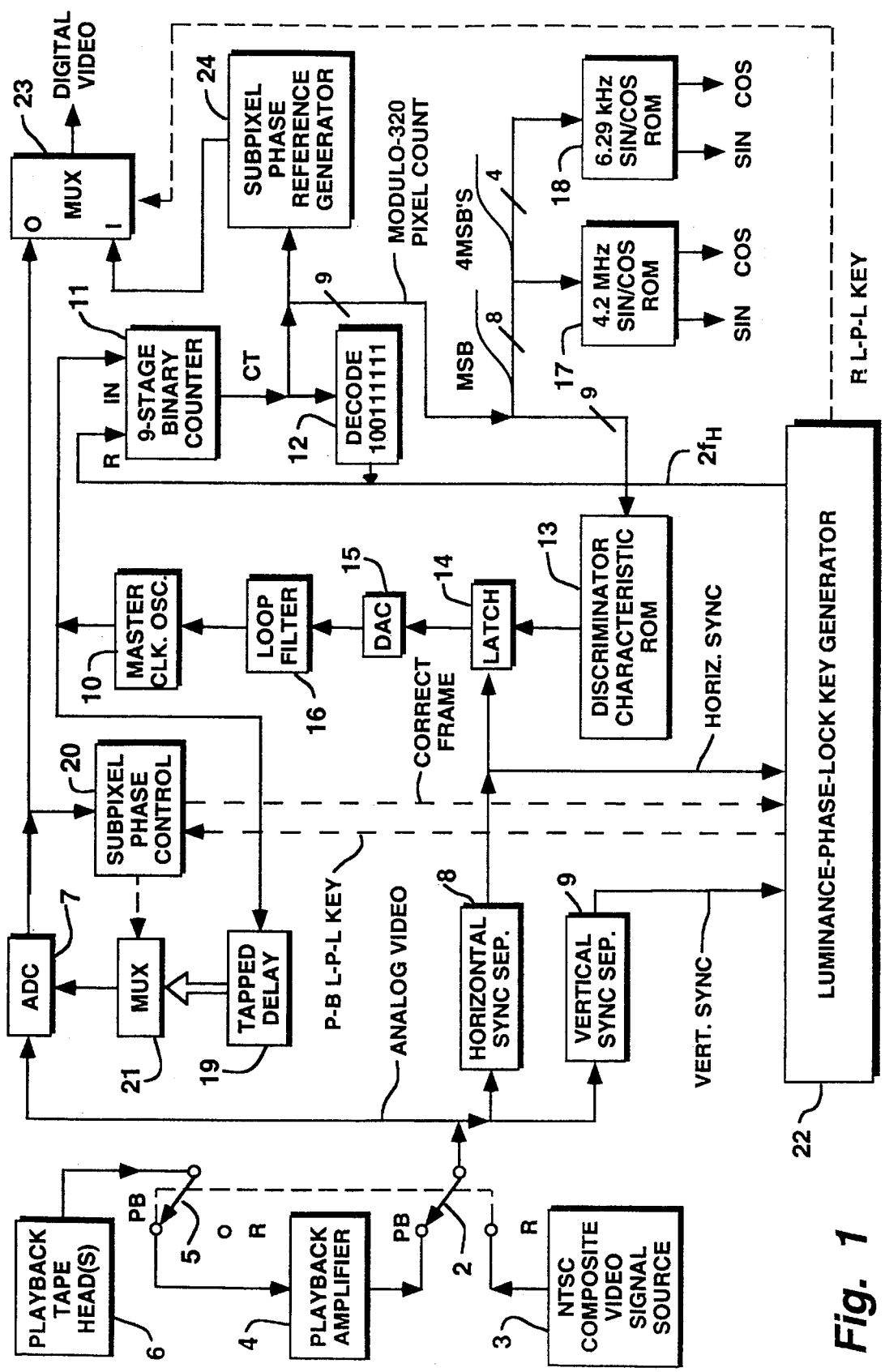
FIG. 1 is a schematic diagram of video tape recorder electronics for phase-locking to horizontal sync the sampling of luminance signal (and of 3.58 MHz chrominance sidebands, during recording), which electronics includes circuitry providing sub-pixel phasing control (SPPC) during playback.

The axes of abscissas in frequency for FIGS. 19–36 are calibrated in megahertz (MHz).

In the figures of the drawing and in the detailed description of those figures which follows this paragraph, the depiction and description of equalizing delays are usually omitted for the sake of emphasizing the distinctive features of the invention and avoiding losing sight of those distinctive features among a crowd of conventional details generally found in video recording systems. One skilled in the art of designing such systems will appreciate the need for such delays to properly align video signals respective to each other and to compensate for unwanted differential delay between video signals arising from differences in the way these signals are processed. Such a skilled person will understand where those delays are necessary and what their values must be.

Further, where analog-to-digital converters are shown or described, one skilled in the art will understand the desirability of preceding them with analog low-pass filters for anti-aliasing; and where digital-to-analog converters are shown or described, one skilled in the art will understand the desirability of following them with analog low-pass filters for suppressing clocking remnants and quantizing noise. These filters will not be explicitly shown nor hereafter described.

In block schematic diagrams control signal connections are shown in dashed line and data signal connections are shown in solid line.

DETAILED DESCRIPTION

The invention will be described in the context of a video tape machine with both tape recording and tape playback capabilities, although the invention may be embodied in certain of its aspects in a video tape machine with but one of these capabilities. The invention does not concern the way in which the sound accompanying the video is recorded and played back. So, for the sake of simplicity in the following description, the apparatus associated with the recording and playing back of the sound accompanying the video, which is conventional in nature, is not described. In a video tape machine with both tape recording and tape playback capabilities, it is commonplace to use portions of the electronics both during recording mode and during playback mode and to reconnect those portions in different ways in the two modes, using a multiple-pole record/playback switch. The elements in those portions of the electronics used both during recording mode and during playback mode will be identified by the same numbers when describing either mode of operation; and the details of the multiple-pole record/playback switch connections of these elements will not be specifically described, inasmuch as the understanding of the details of these interconnections is elementary to engineers of ordinary skill in the art of designing recording and playback electronics for video tape machines. The multiple-pole record/playback switch can be entirely mechanical in nature, being provided by a wafer switch, for example; or the switch may be realized in whole or in part by electronic means.

Referring to FIG. 1, an ANALOG VIDEO signal is selected by a pole 2 of a record/playback switch from a source 3 of NTSC signal during recording or from a playback amplifier 4 during playback. The source 3 of NTSC signal may be a video camera or a television receiver front end. During playback, the playback amplifier 4 is connected by another pole 5 of the record/playback switch to the helically scanning tape heads 6 of the video tape transport.

The COMPOSITE VIDEO signal is applied to an analog-to-digital converter 7 for digitization, to a horizontal sync separator 8 that separates horizontal synchronizing pulses to generate a HORIZONTAL SYNC signal, and to a vertical sync separator 9 that separates vertical synchronizing pulses to generate a VERTICAL SYNC signal. During playback from a video tape recording, the COMPOSITE VIDEO signal is obtained from the helically-scanning playback head(s) of the video tape transport. During video recording the COMPOSITE VIDEO signal may be supplied from a video camera, from a video tape player playing another video tape recording, or from the video (or "second") detector of a television receiver.

A frequency-and-phase-controlled master oscillator 10 generates master clocking pulses at a rate 640 times horizontal synchronizing pulse rate, as controlled by an automatic-frequency-and-phase-control (AFPC)loop locking to the HORIZONTAL SYNC signal from the horizontal sync separator 8. The horizontal sync separator 8 is preferably of a type in which the equalizing pulses do not accompany the separated horizontal sync pulses in the HORIZONTAL SYNC signal. AFPC loop errors that mistime the horizontal scan lines occurring just after the vertical retrace interval are avoided by eliminating the equalizing pulses in the horizontal sync separator 8 output signal HORIZONTAL SYNC. The equalizing pulses can be eliminated responsive to vertical retrace blanking supplied to the horizontal sync separator 8 from the vertical sync separator 9 via the control signal connection shown in FIG. 1 when the AFPC loop is in lock. It is also possible to use the short-pulse eliminator well-known in RADAR to eliminate equalizing pulses in the HORIZONTAL SYNC signal. The AFPC loop controlling oscillator 10, which loop uses a pulse discriminator keyed by separated horizontal sync pulses for generating locking signals, will now be described.

The master clocking pulses are applied to the carry-in terminal of a nine-stage binary counter 11 supplying its count output to a decoder 12, which detects when a three-hundred-nineteen binary count is reached to reset the counter 11 to zero next count. The counter 11 accordingly generates a MODULO-320 PIXEL COUNT signal, repeatedly counting the number of luminance samples in one half a scan line to generate digitized sawteeth at twice scan line rate.

The MODULO-320 PIXEL COUNT signal addresses a read-only memory (ROM) 13 that stores a discriminator characteristic that is zero-valued at zero count, that is substantially symmetric about zero count, that exhibits a high slope through zero count, that is flattened for a wide range of counts from a few counts above zero to one-hundred-fifty-nine binary count, and that is also flattened for a wide range of counts from one-hundred-sixty binary count to a few counts below three-hundred-nineteen binary count. The high slope of the discriminator characteristic through zero count is used to improve the tightness of phase lock in the AFPC loop. Two complete discriminator characteristics are swept through in each of consecutive intervals, each of the same time duration as a horizontal scan line. One of these discriminator characteristics is used to maintain lock to horizontal sync pulses in odd fields of scan; and the other of these discriminator characteristics is used to maintain lock to horizontal sync pulses in even fields of scan, reflective of the half-scan-line offset between horizontal sync pulses in the two fields. Responsive to each horizontal sync pulse from the horizontal sync separator 8, a keyed latch 14 latches the concurring in time value of the discriminator characteristic read from the ROM 13, the latched value to serve as the digitized error signal for the AFPC loop. This digitized error signal is converted to an analog error signal by a digital-to-analog converter 15. The analog error signal is supplied to the loop filter 16, the response of which is applied as AFPC signal to the controlled master clocking oscillator 10.

The eight least significant bits of the MODULO-320 PIXEL COUNT signal addresses a read-only memory (ROM) 17 that stores sine and cosine tables for generating a four-phase 4.21 MHz carrier wave. The four least significant bits of the MODULO-320 PIXEL COUNT signal addresses a read-only memory (ROM) 18 that stores sine and cosine tables for generating an unmodulated four-phase 629 kHz color-under carrier wave.

FIG. 1 also shows sub-pixel phase control circuitry now to be described. The master clocking pulses supplied from controlled oscillator 10 at 640 times horizontal synchronizing pulse rate are applied as input signal to a tapped analog delay line 19, the signals at the successive taps of which are delayed by successive sub-pixel increments. Responsive to a command supplied by sub-pixel phase control circuitry 20, a multiplexer 21 selects one of these sub-pixel phases of the master clocking pulses for application as a sampling command to the analog-to-digital converter 7. During recording, a prescribed median subpixel phasing is imposed by the control circuitry 20.

During recording only, a luminance-phase-lock key generator generates a RECORD LUMA-PHASE-LOCK KEY or R L-P-L KEY signal that goes to logic ONE during that portion of a scan line that occurs during or immediately after vertical retrace interval, into which line portion the signal for controlling sub-pixel phase is inserted. The R L-P-L KEY signal is used for controlling a multiplexer 23 that selects, as a DIGITAL VIDEO signal, the output signal from a sub-pixel phase reference signal generator 24 when the R L-P-L KEY signal is ONE, or the digitized COMPOSITE VIDEO signal from converter 7 when the R L-P-L KEY signal is ZERO. The sub-pixel phase reference signal generator 24 receives control signals from the luminance-phase-lock key-generator-22.

During play-back, the luminance-phase-lock key generator 22 generates a PLAYBACK LUMA-PHASE-LOCK KEY or P-B L-P-L KEY signal that goes to logic ONE during that portion of a scan line that occurs during or immediately after vertical retrace interval, into which line portion is inserted the signal for controlling sub-pixel phase. The sub-pixel phase control circuitry 20 responds to the P-B L-P-L KEY signal going to ONE to adjust the sub-pixel phasing in accordance with the signal for controlling sub-pixel phase contained in the COMPOSITE VIDEO signal recovered during playback from the video tape recording and digitized by the analog-to-digital converter 7.

Figure 2:
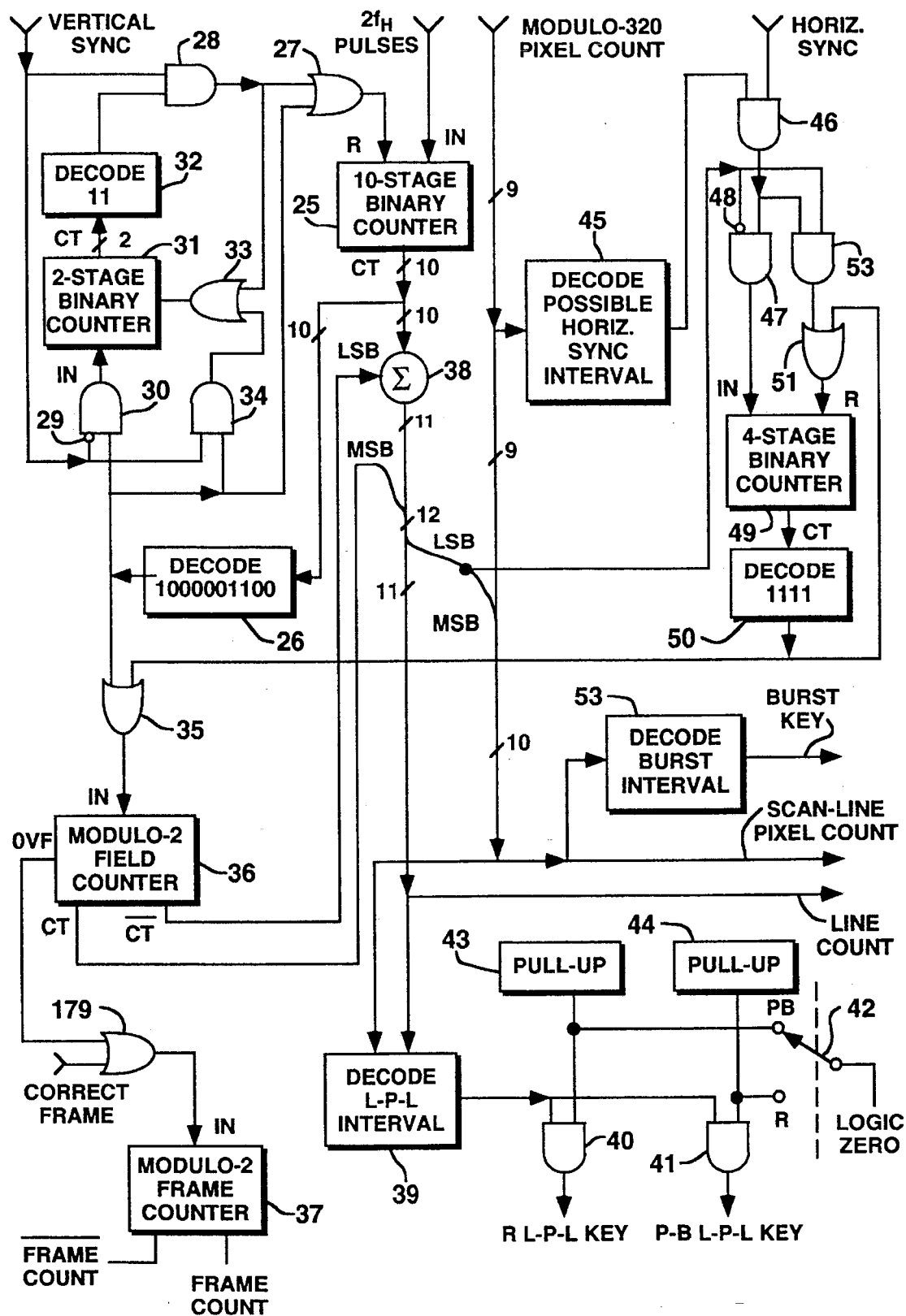
FIG. 2 is a schematic diagram of video tape recorder electronics for identifying the scan lines into which a sub-pixel phase reference signal is inserted during recording to implement sub-pixel phasing control during playback, which electronics includes a counter for generating modulo-two counts of the fields and frames of video signal.

FIG. 2 shows particulars of the luminance-phase-lock key generator 22 of FIG. 1. A ten-stage binary counter 25 in FIGURE 2 counts the pulses from the decoder 12 that in FIG. 1 resets the counter 11 used to generate MODULO-320 PIXEL COUNT. These pulses occur at twice scan line rate, so the count output signal from the counter 25 is a HALF-LINE COUNT signal. In FIG. 2 a decoder 26 resets the count from the counter 25 to zero after a count of five-hundred-twenty-four, so counter 25 counts half scan lines over a field. The resetting signal, generated by decoder 26 output signal going high responsive to a count of five-hundred-twenty-four, is applied to the counter 25 via an OR gate 27.

The OR gate 27 receives from an AND gate 28 another reset signal for application to the counter 25 when it is determined there is a vertical synchronization error in the counter 25 half-line count, with regard to the separated vertical sync pulses supplied from the vertical sync separator 9 of FIG. 1. The AND gate 28 receives these separated vertical sync pulses as one of its input signals, the other of its input signals being a logic ONE only when it is determined there is a vertical synchronization error in the HALF-LINE COUNT from the counter 25. At such time the AND gate 28 is conditioned to repeat the vertical sync pulse in its output signal applied to the OR gate 27, causing the OR gate output signal to reset the counter 25 so its zero count corresponds to the time the vertical sync pulse occurs. Synchronization of the counter 25 is done by a jamming technique because AFPC techniques are too slow, causing a vertical roll in images as recreated on a television screen.

Determining that there is a vertical synchronization error in HALF-LINE COUNT supplied from the counter 25 is done as follows in the FIG. 2 circuitry. A logic inverter 29 supplies a logic ONE output only in the absence of vertical sync pulses. The output signal of an AND gate 30 goes to logic ONE, to indicate when the decoder 26 resets the counter 25 during an absence of vertical sync pulses, presumably an indication that there is a vertical synchronization error in the HALF-LINE COUNT. The output signal of the AND gate 30 could be applied directly to the AND gate 28 to enable selective passage of the vertical sync information, but an error in a single vertical sync interval could then disrupt the proper counting of half scan lines by the counter 25. To forestall this happening, the logic ONE from the AND gate 30 is applied to a counter 31. After a prescribed number of successive vertical synchronization error indications are counted by the counter 31 —e.g. three in a two-stage counter—a decoder 32 responds to this count to enable the AND gate 28 to respond to the vertical sync pulses from the separator 9, resetting the counter 25 to zero count via the OR gate 27 and resetting the counter 31 to zero count via an OR gate 33.

The counter 31 is prevented from integrating up to full count on isolated vertical synchronization error indications, as follows. An AND gate 34 responds to the simultaneous occurrence of a vertical synchronization pulse and the decoder 26 generating a reset pulse for the counter 25 to generate an indication that the half-line count from the counter 25 is properly synchronized with vertical retrace. This indication is applied via the OR gate 33 as a reset pulse for the counter 31.

The indications of vertical retrace interval from the decoder 26 are supplied via an OR gate 35 as count input signal to a one-stage binary counter 36, which generates a FIELD COUNT signal that is a modulo-two count of the number of fields of video signal. The overflow, or carry out, signal from the field counter 36 is supplied via an OR gate 179 as count input for another one-stage binary counter 37, which generates as FRAME COUNT signal a modulo-two count of the number of frames of video signal. The one's complement of the FIELD COUNT signal is preceded by nine more significant ZERO bits in a zero extension towards greater significance, and the resulting ten-bit number is summed in a digital adder 38 with the ten-bit HALF-LINE COUNT the counter 25 generates. The least-significant bit of the adder 38 sum is used as the modulus of a SCAN-LINE PIXEL COUNT signal which has as its residue the MODULO-320 PIXEL COUNT. A LINE COUNT signal is formed that is a modular number with a modulus provided by properly synchronized FIELD COUNT signal and with a residue provided by the ten more-significant bits of the eleven-bit sum from the adder 38. The way in which the counter 25 is synchronized to count five-hundred-twenty-five half scan lines during each field of video signal is described above. The proper synchronization of the FIELD COUNT signal will be described further on in this specification.

The LINE COUNT described above has some peculiarities that are exploited in the folding of luminance signal, which procedure will be described further on in this specification with reference to FIG. 4 of the drawing. In odd fields the least significant bit of the LINE COUNT signal is ZERO for odd lines (e.g., the first line as conventionally considered causing unaugmented successive half-line counts of 00 0000 0000 and 00 0000 0001 from adder 38, to result in zero residue when the least-significant bits are struck off) and ONE for even lines (e.g., the second line as conventionally considered causing unaugmented successive half-line counts of 00 0000 0010 and 00 0000 0011 from adder 38, to result in unity residue when the least-significant bits are struck off). In even fields the least significant bit of the LINE COUNT signal is ONE for odd lines (e.g., the 263th line as conventionally considered causing augmented successive half-line counts of 00 0000 0010 and 00 0000 0011 from adder 38, to result in unity residue when the least-significant bits are struck off) and ZERO for even lines.

A decoder 39 in FIG. 2 decodes the LINE COUNT identifying the horizontal scan line into which sub-pixel phasing information is to be inserted, thereby generating a LUMA-PHASE-LOCK KEY or L-P-L KEY signal that is logic ONE supplied as one input signal both to a two-input AND gate 40 and to a two-input AND gate 41. Except during playback, when a pole 42 of the record/playback switch short-circuits its output terminal to logic ZERO, a pull-up 43 applies a logic ONE as a further input signal to the AND gate 40, conditioning the AND gate 40 to generate the RECORD LUMA-PHASE-LOCK KEY or R L-P-L KEY signal. Except during recording, when the pole 42 of the record/playback switch short-circuits its output terminal to logic ZERO, a pull-up 44 applies a logic ONE as a further input signal to the AND gate 41, conditioning the AND gate 41 to generate the PLAYBACK LUMA-PHASE-LOCK KEY or P-B L-P-L KEY signal.

FIG. 2 also shows how the FIELD COUNT signal from the field counter 36 can be properly synchronized to the COMPOSITE VIDEO signal, assuming the counter 35 to be a triggered or "T" type of flip-flop. The SCAN-LINE PIXEL COUNT signal is supplied to a decoder 45 that generates a logic ONE signal twice during each scan line: once during the interval that horizontal synchronizing pulses should occur in fields of the COMPOSITE VIDEO signal and again during an interval half a line scan later. An AND gate 46 responds to the simultaneous occurrence of this logic ONE and a horizontal sync pulse to generate a logic ONE that, providing the controlled master clock oscillator 10 of FIG. 1 is in phase lock with horizontal synchronization, repeats the horizontal sync pulse. The AND gate 46 rejects impulse noise that might occur between horizontal sync pulses, taking advantage of the noise immunity of the master clock oscillator 10 AFPC loop.

Because of the timing relationships between horizontal and vertical synchronizing pulses being somewhat different in an odd field and in an even field, the least-significant bit of the sum from the adder 38 will be a ONE during the first half of horizontal scan lines if the FIELD COUNT signal supplied from the field counter 36 is correctly phased, or will be a ZERO if the FIELD COUNT signal is incorrectly phased. An AND gate 47 responds to the simultaneous occurrence of the repeated horizontal sync pulse, and a ONE supplied from a bit-inverter 48 as the complement of a ZERO-valued least-significant bit of the sum from the adder 38 to generate a logic ONE. This ONE from the AND gate 47 indicates that the horizontal pulse falls into a time interval that the field counter 36 incorrectly reckons to be the beginning of the last half of the horizontal scan line and signals an error in the FIELD COUNT.

The ONE from the AND gate 47 could be applied directly to the OR gate 35 and used to toggle the counter 36 to correct FIELD COUNT. However, an impulse noise excursion occurring just after the beginning of the last half of the horizontal scan line would generate an erroneous signaling of error in the FIELD COUNT. To provide immunity against the occasional or few-time occurrence of such noise excursions, the logic ONEs issuing from the AND gate 47 are counted in a plural-stage counter 49. When a prescribed count has been reached by counter 49, a decoder 50 decodes this count to generate a logic ONE supplied as a reset pulse to the counter 49 via an OR gate 51. The logic ONE from the decoder 50 is also supplied via the OR gate 35 to the count input of the field counter 36, to force it to change from incorrect field count to correct field count.

An AND gate 52 generates a ONE responsive to the AND gate 46 supplying a repeated horizontal sync pulse when the least-significant bit of the sum from the adder 38 is a ONE indicating that the field counter 36 reckons that the first half of a horizontal line is being scanned. The logic ONE generated by the AND gate 52, which ONE indicates that the FIELD COUNT is correct, is supplied as a reset pulse to the counter 49 via the OR gate 51. Accordingly, the prescribed count condition decoded by the decoder 50 will be reached only when field count errors have been generated in as many consecutive scan lines. By way of example, the counter 49 is shown as being a four-stage counter and the decoder 50 as decoding a count of fifteen to generate a logic ONE. This, plus the resetting of the counter 49 when a scan line occurs without a field-count error signal being generated to pulse the output signal of the OR gate 51 to logic ONE, makes it necessary that field count errors be generated during fifteen consecutive scan lines before the field counter 36. Accordingly, it is very unlikely that that flip-flop will be erroneously triggered by impulse noise, to change an already correct FIELD COUNT to an incorrect FIELD COUNT.

FIG. 2 also shows how a COLOR BURST KEY signal is generated. The SCAN-LINE PIXEL COUNT signal is supplied to a decoder 53 that generates a logic ONE signal during the time that color burst should occur in the composite video signal that is supplied as ANALOG VIDEO signal during recording.

Figure 3:
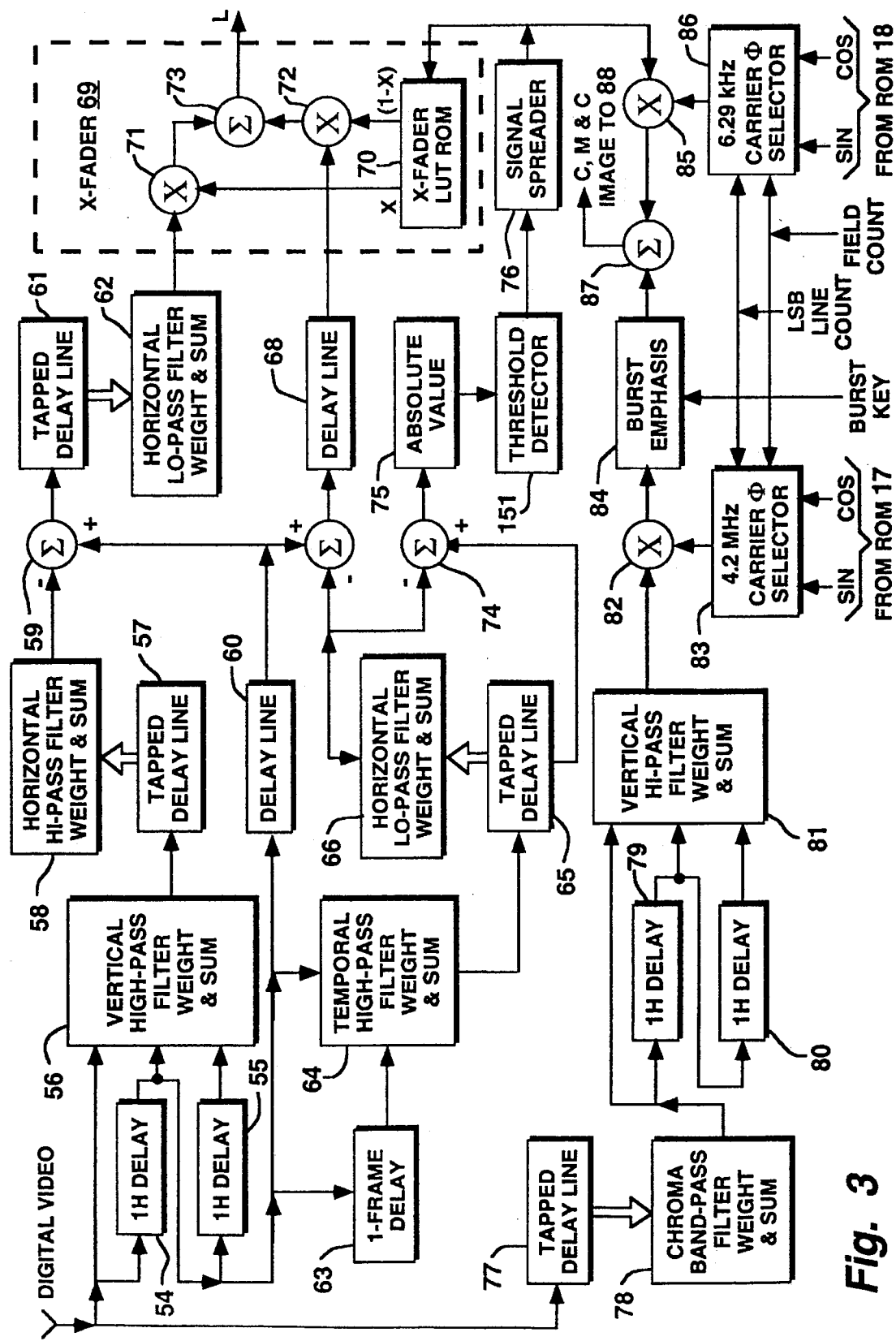
FIG. 3 is a schematic diagram of video tape recorder recording electronics used for separating digitized composite video signal into luminance, chrominance and motion signal components.

FIG. 3 shows the recording electronics used for separating into luminance, chrominance and motion signal components the DIGITAL VIDEO signal supplied by the analog-to-digital converter 7 of FIG. 1 digitizing the NTSC composite video signal from source 3 thereof. The DIGITAL VIDEO signal is supplied to cascaded single-horizontal-scan-line (1H) digital delay lines 54 and 55 to obtain temporally aligned samples representative of three pixels in vertical alignment in a television image, to be used in line-comb filtering procedures. These 1H digital delay lines can be realized, for example, with random access memory addressed in a single dimension by the SCAN-LINE PIXEL COUNT signal and operated on a read-then-write basis.

As known, low-pass line-comb filtering (spatial low-pass filtering in the transverse or vertical direction) extracts the luminance component from a composite video signal, without motion between frames causing objectionable artifacts in the filtered luminance signal, but with some loss of spatial resolution in directions diagonal to line scan. A weight-and-sum circuit 56 weights by a factor +0.5 a DIGITAL VIDEO sample from one line back, as delayed by the 1H delay line 54, and weights by a factor −0.25 both a current DIGITAL VIDEO sample and a DIGITAL VIDEO sample from two lines back, as delayed by the cascaded 1H delay lines 54 and 55. These weighted samples are summed in circuit 56 to generate a vertical high-pass filter response, which is supplied to a multiple-tap digital delay line 57. The signals from the taps of the delay line 57 are applied to a weight-and-sum circuit 58, which implements a horizontal high-pass filter that typically is designed to exhibit 6 dB cut off at about 1.7 MHz. This horizontal high-pass filter in cascade with the preceding vertical high-pass filter selects the chrominance components and diagonal luminance detail components. These components are then subtracted in a digital subtractor 59 from composite DIGITAL VIDEO signal, as delayed one scan line by the 1H delay line 54, and as provided further delay by the digital delay line 60 to compensate for the horizontal high-pass filter delay, thereby to recover a difference signal that is the line-combed luminance component of the DIGITAL VIDEO signal. This difference signal is supplied to a multiple-tap digital delay line 61 and the signals from the taps of the delay line 61 are applied to a weight-and-sum circuit 62, which implements a horizontal low-pass filter for the line-combed luminance component of the DIGITAL VIDEO signal that typically is designed to exhibit 6 dB cut off at about 3.3 MHz.

The DIGITAL VIDEO signal as delayed one scan line by the 1H delay line 54 is supplied to a single-frame delay line 63. Delay line 63 can be realized, for example, with random access memory addressed in a first dimension by the SCAN-LINE PIXEL COUNT signal, addressed in a second dimension by the LINE COUNT signal, and operated on a read-then-write basis. As known, low-pass frame-comb filtering (temporal low-pass filtering) extracts the luminance component from a composite video signal without loss of spatial resolution and, as long as there is no motion between frames, without objectionable artifacts being introduced into the filtered luminance signal. In a temporal high-pass filtering step, a weight-and-sum circuit 64 weights by a factor +0.5 a DIGITAL VIDEO signal from one scan line back taken from the 1H delay line 54, weights by a factor −0.5 a DIGITAL VIDEO signal from one frame plus one scan line back taken from the single-frame delay line 63, and sums the weighted DIGITAL VIDEO signals. The resulting temporal gradient signal from the weight-and-sum circuit 64 tends to have a strong color subcarrier sidebands component since the phase of color subcarrier alternates from one frame to the next. The temporal gradient signal from the weight-and-sum circuit 64 is applied as the input signal to a multiple-tap digital delay line 65. The signals from the taps of the delay line 65 are applied to a weight-and-sum circuit 66, which implements a horizontal high-pass filter for the temporal gradient signal that separates its color subcarrier sidebands component therefrom. The color subcarrier sidebands component separated by the horizontal high-pass filtering of the temporal gradient signal is subtracted in a digital subtractor 67 from composite DIGITAL VIDEO signal, as provided one scan line delay by 1H delay line 54 and further compensating delay by the digital delay line 60, to recover a difference signal. This difference signal, which is a frame-combed horizontal low-pass filter response free of chroma, is supplied to a digital delay line 68 that provides compensatory delay to match that delay the horizontal low-pass filter elements 61 and 62 introduce into the line-combed luminance component of the DIGITAL VIDEO signal.

In FIG. 3 a cross-fader, or "soft switch", 69 generates an L luminance signal by selecting luminance signal extracted from DIGITAL VIDEO signal by line-combed spatial low-pass filtering in those portions of a frame where there is substantial motion and by selecting luminance signal extracted from DIGITAL VIDEO signal by frame-combed temporal low-pass filtering in those portions of a frame where there is little or no motion. The cross-fader 69 is controlled by a MOTION signal that addresses a read-only memory storing multiplier signals X and (1−X) in a look-up table. In those portions of a frame where there is substantial motion the MOTION signal has an arithmetic one value; in those portions of a frame where there is little or no motion the MOTION signal has an arithmetic zero value; and during transitions between portions of a frame in which the MOTION signal is respectively zero and one, the MOTION signal may temporarily assume values between arithmetic zero and one. The multiplier signal X is applied to a digital multiplier 71 receptive of line-combed horizontally low-pass filtered DIGITAL VIDEO signal from the weight-and-sum circuit 62. The multiplier signal (1−X) is applied to a digital multiplier 72 receptive of frame-combed temporally low-pass filtered DIGITAL VIDEO signal from the digital delay line 68. The products from the digital multipliers 71 and 72 are summed by a digital adder 73, the sum signal from which is the L luminance signal that is the output signal of the cross-fader 69 during recording.

The MOTION signal is generated as follows. A digital subtractor 74 subtracts, from suitably delayed temporal gradient signal taken from the tapped digital delay line 65, the color subcarrier sidebands component separated by the weight-and-sum circuit 66 as horizontal high-pass filter response to the temporal gradient signal. This provides horizontal low-pass filtering of the temporal gradient signal that typically is designed to exhibit 6 dB cut off at about 1.7 MHz. The resulting difference signal supplied from the subtractor 74 represents frame-to-frame changes of luminance amplitude for each sequentially scanned pixel location, which changes (ignoring noise variations) are usually linked to image motion. This difference signal is supplied to an absolute-value circuit 75 for rectification. A threshold detector 151 comprises a digital comparator that generates a single-bit output signal that is ONE when and only when the resulting rectification response exceeds a threshold value and that is otherwise ZERO. The threshold value is set to be above the expected noise level. The threshold detector 151 output signal is supplied as input signal to a signal-spreader circuit 76, which responds to generate the MOTION signal. The signal-spreader circuit 76 may take the form described by J-W Ko and H. J. Weckenbrock in their U.S. Pat. No. 5 083 203 issued 21 Jan. 1992, entitled CONTROL SIGNAL SPREADER and assigned to Samsung Electronics Co., Ltd.

The DIGITAL VIDEO signal obtained by digitizing the NTSC composite video signal is supplied to a multiple-tap digital delay line 77 and thence to a weight-and-sum circuit 78 that implements a chroma band-pass filter separating a chroma signal consisting of the color subcarrier modulation components surrounding a suppressed 3.58 MHz color subcarrier, as sampled at master clock rate. Diagonal details of the luminance signal undesirably accompany this chroma signal in the output signal from the weight-and-sum circuit 78, which output signal is applied to cascaded 1H digital delay lines 79 and 80. A weight-and-sum circuit 81 weights by a factor +0.5 a sample of chroma bandpass filter response from one line back, as delayed by the 1H delay line 79, and weights by a factor −0.25 both a current sample of chroma bandpass filter response and a sample of chroma bandpass filter response from two lines back, as delayed by the cascaded 1H delay lines 79 and 80. These weighted samples are summed in circuit 81 to generate a vertical high-pass filter response to separated chroma signal, which response is free of luminance signal diagonal detail.

One skilled in the art of digital filter design will understand that the comb filter circuits shown in FIG. 3 may be replaced with alternative designs in which vertical filtering is carried out with filters having two-scan-line height kernels, rather than the three-scan-line height kernels shown. Such alternative designs are somewhat more economical of digital hardware.

Digitized color subcarrier modulation components surrounding a suppressed 3.58 MHz color subcarrier and free from luminance diagonal detail are supplied from the weight-and-sum circuit 81 to a four-quadrant digital multiplier 82, there to be multiplied for the duration of each scan line by a selected phase of the four-phase 4.21 MHz carrier wave to generate a modulated four-phase color-under signal. Carrier-phase selection circuitry 83 includes circuitry for generating 4.21 MHz carrier wave in 0°, 90°, 180° and 270° phases, proceeding from the sine and cosine values supplied by the ROM 17 of FIG. 1 responsive to its addressing by MODULO-320 PIXEL COUNT signal, by using each of those values directly and as multiplied by minus unity. Carrier-phase selection circuitry 83 further includes a multiplexer for selecting the appropriate one of the 0°, 90°, 180° and 270° phases of 4.21 MHz carrier wave responsive to the FIELD COUNT and to the least significant bit of the LINE COUNT, such that the phase of the chroma-modulated color-under carrier supplied as product from the digital multiplier 82 to a burst emphasis circuit 84 progresses +90° per scan line according to the conventional VHS video recording standard. The burst emphasis circuit 84 responds to COLOR BURST KEY signal supplied from the FIG. 2 decoder 53 to boost the amplitude of burst respective to the other portions of the modulated color-under carrier, to generate a C signal suited for video tape recording.

The MOTION signal must be included in the signal used for video tape recording, so that the MOTION signal may be recovered during playback for use in restoring luminance. The MOTION signal is supplied as multiplicand signal to a four-quadrant digital multiplier 85, there to be multiplied for the duration of each scan line by a selected phase of the four-phase 629 kHz color-under carrier wave to generate a modulated four-phase color-under carrier identified as M signal in FIG. 3. Carrier-phase selection circuitry 86 includes circuitry for generating 629 kHz color-under carrier wave in 0°, 90°, 180° and 270° phases, proceeding from the sine and cosine values supplied by the ROM 18 of FIG. 1 responsive to its addressing by MODULO-320 PIXEL COUNT signal, by using each of those values directly and as multiplied by minus unity. Carrier-phase selection circuitry 86 further includes a multiplexer for selecting the appropriate one of the 0°, 90°, 180° and 270° phases of 629 kHz color-under carrier wave responsive to the FIELD COUNT and to the least significant bit of the LINE COUNT, such that the phase of the motion-modulated color-under carrier supplied as product from the digital multiplier 85 regresses −90° per scan line. The M and C signals are summed in a digital adder 87 to generate a signal identified as C, M & C IMAGE signal in FIGS. 3 and 4, which signal comprises a set of composite color-under carrier sidebands.

Figure 4:
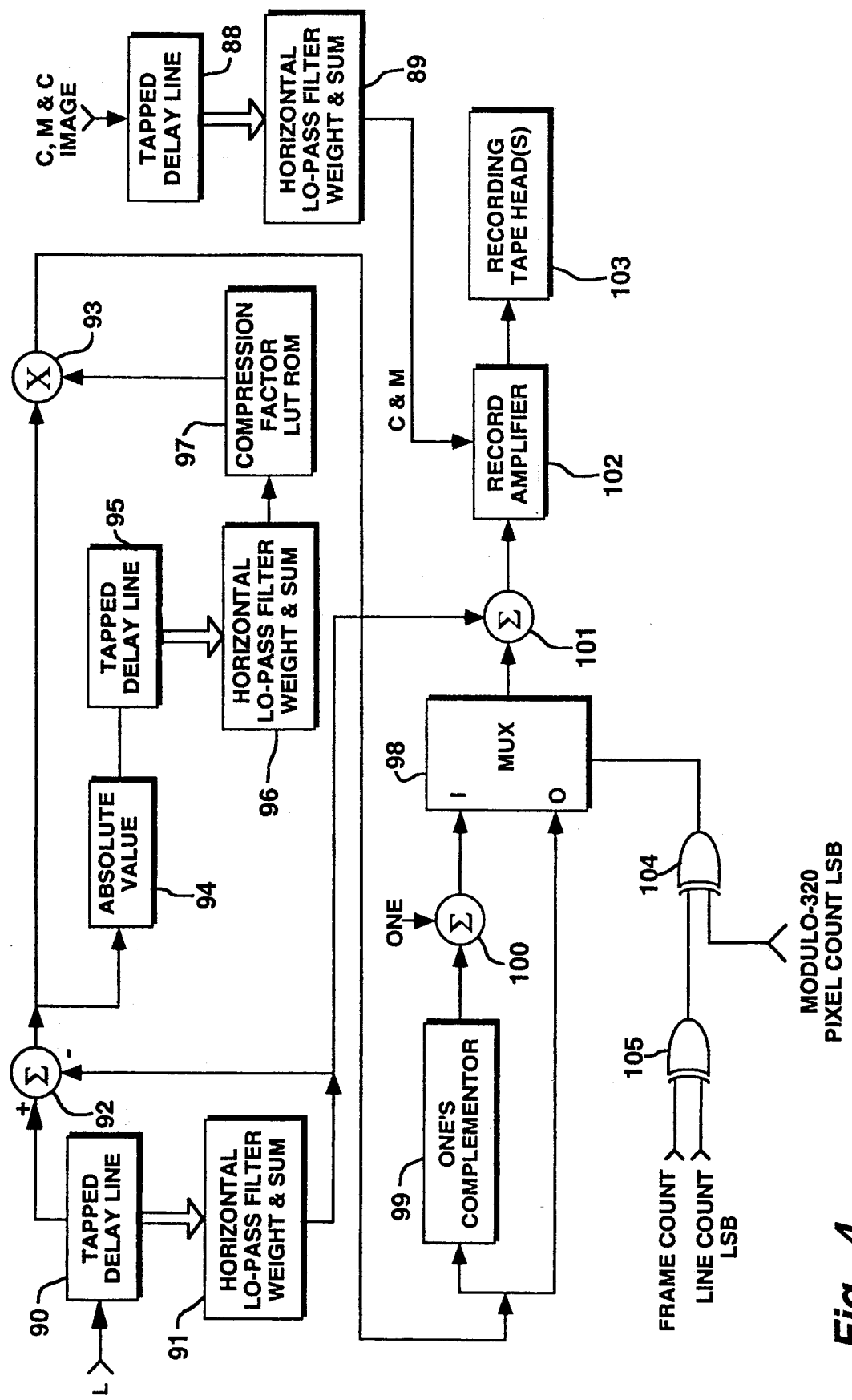
FIG. 4 is a schematic diagram of video tape recorder recording electronics used for generating folded-luminance signals in which components in a higher-frequency (e.g., above 2.5 MHz) band have been de-emphasized, which electronics includes a balanced modulator and embodies the invention.

FIG. 4 shows a multiply-tapped digital delay line 88 receiving the C, M & C IMAGE signal as its input signal. A weight-and-sum circuit 89 weights signals from the taps of the delay line 88 so as to implement a horizontal low-pass filter with a cut-off frequency of around 1.2–1.3 MHz providing a C&M signal response substantially free of the 7.8 MHz C IMAGE signal otherwise accompanying the C signal as a result of the 4.2 MHz heterodyne in the multiplier 82.

The L luminance signal, supplied during recording from the cross-fader 69 in FIG. 3, is applied in FIG. 4 to a tapped digital delay line 90. The delay line 90, a weight-and-sum circuit 91 and a digital subtractor 92 are connected to form a band splitter filter that separates the L luminance signal into low-pass and high-pass filter responses with a cross-over frequency of 2.52 Mhz or one-quarter master clock sampling rate. The signals from the taps of the delay line 90 are applied to the weight-and-sum circuit 91, which generates the horizontal low-pass filter response. A digital subtractor 92 subtracts the horizontal low-pass filter response supplied by the weight-and-sum circuit 91 from suitably delayed L signal taken from the tapped digital delay line 90, to generate the horizontal high-pass filter response as the subtractor 92 difference output signal. As one skilled in the art of digital filtering appreciates digital band splitter filters are advantageous over analog band splitter filters in that linear phase response through the region of cross-over between the low frequency and high-frequency bands is readily obtained, which makes considerably simpler the rejoining of the two bands later on. The phase linearity is achieved by making the finite-impulse-response (FIR) low-pass filter comprising the tapped delay line 90 and the weight-and-sum circuit 91 one with a symmetrical weighting of the signals taken from the taps of the delay line 90, in accordance with the customary horizontal low-pass filter design procedure.

A two-quadrant digital multiplier 93 multiplies the horizontal high-pass filter response to L signal by factors less than one before it is folded into baseband. This is done to compress the response and attenuate it respective to the horizontal low-pass filter response to L signal, which reduces the visibility of the reversed frequency spectrum resulting from folding in television images recovered from the video tape recording by VHS tape machines already in the field. The multiplication factor used to compress the horizontal high-pass filter response to L signal is determined as follows. An absolute-value circuit 94 rectifies the horizontal high-pass filter response to L signal. The rectified horizontal high-pass filter response to L signal is supplied to a tapped digital delay line 95. The signals from the taps of the delay line 9,5 are applied to a weight-and-sum circuit 96. The circuit 96 supplies a low-pass filter response to the rectified horizontal high-pass filter response to L signal, which response addresses a read-only memory 97 that stores the multiplier signals supplied to digital multiplier 93 to effect compression and attenuation of the horizontal high-pass filter response to L signal.

Choosing the master clock sampling rate (which samples luminance signals) to be twice the folding carrier frequency permits the folding procedure to be implemented simply, without need for a digital multiplier: The folded response to the band of compressed and attenuated higher-frequency luminance components is generated by a multiplexer 98, by alternately selecting at master clock sampling rate either the current sample of the compressed and attenuated horizontal high-pass filter response to L luminance signal or its negative, as generated by applying each current sample to a one's complementor 99 and augmenting the result by one in a digital adder 100.

In variants of the procedures described in the two paragraphs immediately proceeding, the horizontal high-pass filter response to L signal may be folded without its first being attenuated respective to the horizontal low-pass filter response to L signal. This can be done if there is no particular concern with providing backward compatability of the video tape recording with folded-luminance signal, in order to accommodate VHS tape machines already in the field. Folding the horizontal high-pass filter response to L signal without its first being attenuated can also be done without sacrificing backward compatability, by subjecting the balanced modulation signal from the multiplexer 98 to attenuation rather than the horizontal high-pass filter response to L signal used as modulating signal. This is done by supplying the balanced modulation signal from the multiplexer 98 to elements corresponding to elements 93–97 and connecting similarly with each other and supplying the resulting attenuated balanced modulation signal to the adder 101 to be combined with the horizontal low-pass filter response to L signal supplied from the weight-and-sum circuit 91.

The band of higher-frequency luminance components folded into baseband is supplied by the multiplexer 98 as a summand input signal to a digital adder 101, which receives from weight-and-sum circuit 91 as its other summand input signal the band of lower-frequency luminance components residual in the baseband. The adder 101 supplies its sum signal, the complete folded-luminance signal, to a recording amplifier 102 in which that signal is subjected to recording equalization, is converted to analog form, and then is used to frequency-modulate (FM) a carrier occupying the 1.2–7.0 Mhz band. The recording amplifier also receives the color-under carrier that has been amplitude-modulated by C&M signal, which is converted to analog form and combined with the frequency-modulated luminance carrier also in analog form to form a composite signal applied to the helically scanning recording head(s) 103 of the video tape transport.

One skilled in the art of digital design will recognize that the combination of elements 98–101 is what is commonly referred to as a "controlled digital adder" or as a "digital adder/subtractor". Without introducing much error, the output signal of the one's complementor 99 may be applied directly to the multiplexer 98 instead of through the adder 100 for augmenting by unity. In another variation the adder 100 may augment the output signal of the one's complementor. 99 by the control signal for the multiplexer 98 rather than unity.

The phase of the folding carrier used by the adder/subtractor in generating folded-luminance signals reverses from one horizontal scan line to the next within each field, and the pattern of phase reversal is different in even frames than it is in odd frames. These procedures reduce the visibility of the band of higher-frequency luminance components folded into baseband in a television picture recovered from the video tape recording. An exclusive-OR gate 104 receives the least-significant bit of MODULO-320 PIXEL COUNT as one of its two input signals, receives as its other input signal the output signal of another exclusive-OR gate 105, and applies its output signal as control signal to the multiplexer 98.

The exclusive-OR gate 105 receives FRAME COUNT as one of its two input signals and the least-significant bit of LINE COUNT as its other input signal. These signals do not change during the duration of a horizontal scan line, so XOR gate 105 output signal to the XOR gate 104 does not change during the duration of a horizontal scan line. The least-significant bit of the MODULO-320 PIXEL COUNT applied to the XOR gate 104 alternates between ZERO and ONE at the 10.2 MHz master clock rate, however, thus conditioning XOR gate 104 to supply to the multiplexer 98 a control signal that also alternates between ZERO and ONE at the 10.2 MHz master clock rate during each horizontal scan line, with a phasing dependent on the XOR gate 105 output signal maintained for the duration of that scan line. The initial pixel of a scan line is associated with a ZERO least-significant bit of the MODULO-320 PIXEL COUNT, as applied as an input signal to the XOR gate 104.

In the following five paragraphs, the numbering of the horizontal scan lines is described in terms of NTSC standard. During an odd frame, when FRAME COUNT is ONE, the XOR gate 105 output signal applied to the XOR gate 104 duplicates the least-significant bit of LINE COUNT signal.

In the initial, odd field of an odd frame, the least-significant bit of LINE COUNT is a ZERO during odd-numbered scan lines. This, together with the ZERO least-significant bit of the MODULO-320 PIXEL COUNT for the initial pixel of a scan line, causes a ZERO XOR gate 104 response that conditions the multiplexer 98 to select the non-inverted folded high-frequency luminance band for summation with the low-frequency luminance band in the adder 101 during the initial pixels of each of those odd-numbered scan lines.

In the initial, odd field of an odd frame, the least-significant bit of LINE COUNT is a ONE during even-numbered scan lines. This, together with the ZERO least-significant bit of the MODULO-320 PIXEL COUNT for the initial pixel of a scan line, causes a ONE XOR gate 104 response that conditions the multiplexer 98 to select the inverted folded high-frequency luminance band for summation with the low-frequency luminance band in the adder 101 during the initial pixels of each of those even-numbered scan lines.

In the final, even field of an odd frame, the least-significant bit of LINE COUNT is a ONE during odd-numbered scan lines. This, together with the ZERO least-significant bit of the MODULO-320 PIXEL COUNT for the initial pixel of a scan line, causes a ONE XOR gate 104 response that conditions the multiplexer 98 to select the inverted folded high-frequency luminance band for summation with the low-frequency luminance band in the adder 101 during the initial pixels of each of those odd-numbered scan lines.

In the final, even field of an odd frame, the least-significant bit of LINE COUNT is a ZERO during even-numbered scan lines. This, together with the ZERO least-significant bit of the MODULO-320 PIXEL COUNT for the initial pixel of a scan line, causes a ZERO XOR gate 104 response that conditions the multiplexer 98 to select the non-inverted folded high-frequency luminance band for summation with the low-frequency luminance band in the adder 101 during the initial pixels of each of those even-numbered scan lines.

During an even frame, when FRAME COUNT is ZERO, the XOR gate 105 output signal applied to the XOR gate 104 is the complement of the least-significant bit of LINE COUNT signal, reversing the initial pixel conditions for the horizontal scan lines in an even frame from those specified above for an odd frame. Since the pattern of phase reversal during folding of the luminance signal is different in even frames than it is in odd frames, it is necessary to insert FRAME COUNT information into the recorded video signal so that unfolding of the luminance signal during playback is done in correct phasing, rather than the reverse phasing. This FRAME COUNT information can be inserted into the recorded video signal by the sub-pixel phase reference generator 29 of FIG. 1.

Figure 5:
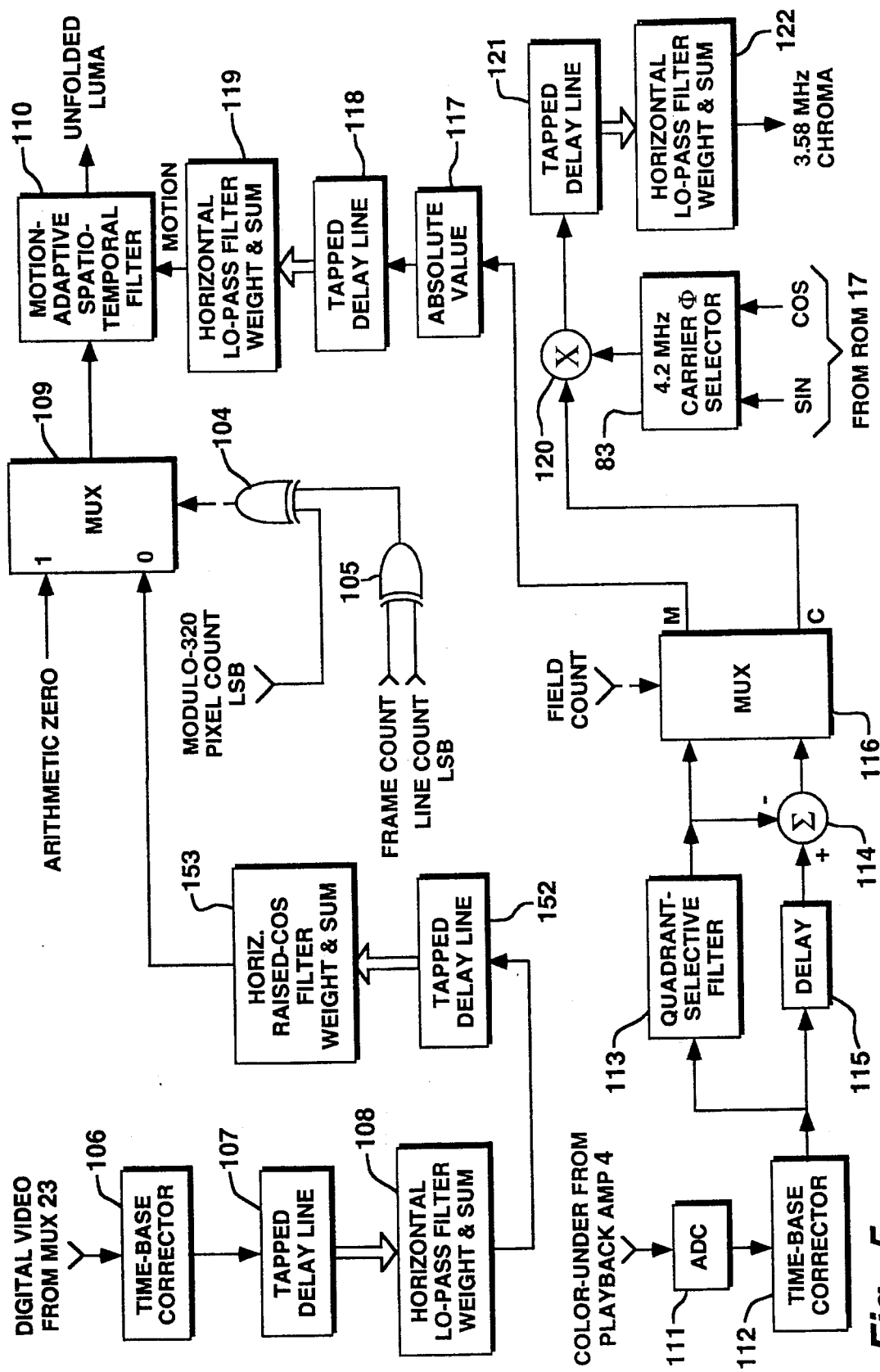
FIG. 5 is a schematic diagram of video tape recorder playback electronics used for unfolding the folded-luminance signal, for separating the motion and chrominance signals from the color-under carrier, and for remodulating the chrominance sidebands back onto a suppressed 3.58 MHz color subcarrier.

FIG. 5 shows some of the playback electronics for the video recorder in addition to the electronics shown in FIGS.

1 and 2, which electronics are used both during recording and during playback. Referring back to FIG. 1, the DIGITAL VIDEO signal supplied from the multiplexer 23 during playback is the digitized response of the analog-to-digital converter 7 to the ANALOG VIDEO signal that is luminance signal supplied from the playback amplifier 4, owing to pole 2 of the record/playback switch being in the playback position. The DIGITAL VIDEO signal supplied from the multiplexer 23 is applied to a time-base corrector 106 during playback. (By way of example, a time-base corrector can be a first-in/first-out semiconductor memory, having a two sets of 640 storage locations alternately written and read each during the course of a scan line. A line of 640 digital samples as timed by the AFPC'd master clock oscillator 10 are written into the set of 640 storage locations selected for writing during the current scan line. Meanwhile the other set of 640 storage locations are sequentially read from, as timed by a crystal-stabilized 10.2 MHz clock oscillator. This crystal-stabilized 10.2 MHz clock oscillator is not subject to the AFPC-loop errors and jitter introduced by tape handling problems that can afflict the AFPC'd master clock oscillator 10 during playback from a video tape recording.) The resulting time-base-corrected DIGITAL VIDEO signal is supplied from the time-base corrector 106 to a multiply-tapped digital delay line 107. The signals from the taps of the delay line 107 are applied to a weight-and-sum circuit 108, which implements horizontal low-pass filtering of the DIGITAL VIDEO signal that suppresses remnants of the frequency-modulation.

It is convenient to use digital filtering to perform the playback equalization that compensates for the roll-off of DIGITAL VIDEO signal that would otherwise occur because of bandwidth limitations in the video tape recording procedure. FIG. 5 shows, in cascade connection after the horizontal low-pass filter comprising elements 107 and 108, a finite-impulse response playback-equalization filter comprising a multiply-tapped digital delay line 152 and a weight-and-sum circuit 153. The weights in the weight-and-sum circuit 153 provide a peak around 3 MHz; and the system characteristic for the digital playback-equalization filter may provide a raised-cosine response, by way of example. Rather than using cascaded horizontal low-pass filter and playback-equalization filters, cascaded as shown or in opposite order, a single digital filter having a response similar to the product of the responses of the cascaded horizontal low-pass filter and playback-equalization filters can be used instead.

The time-base-corrected, horizontally low-pass filtered DIGITAL VIDEO signal with playback equalization is supplied to an unfolding circuit comprising a multiplexer 109 controlled by signal generated by the XOR gates 104 and 105. The unfolded high-band response to the time-base-corrected horizontally low-pass filtered DIGITAL VIDEO signal is generated by the multiplexer 109, by alternately selecting at master clock sampling rate either the current sample of the time-base-corrected horizontally low-pass filtered DIGITAL VIDEO signal or arithmetic zero.

Figure 7:
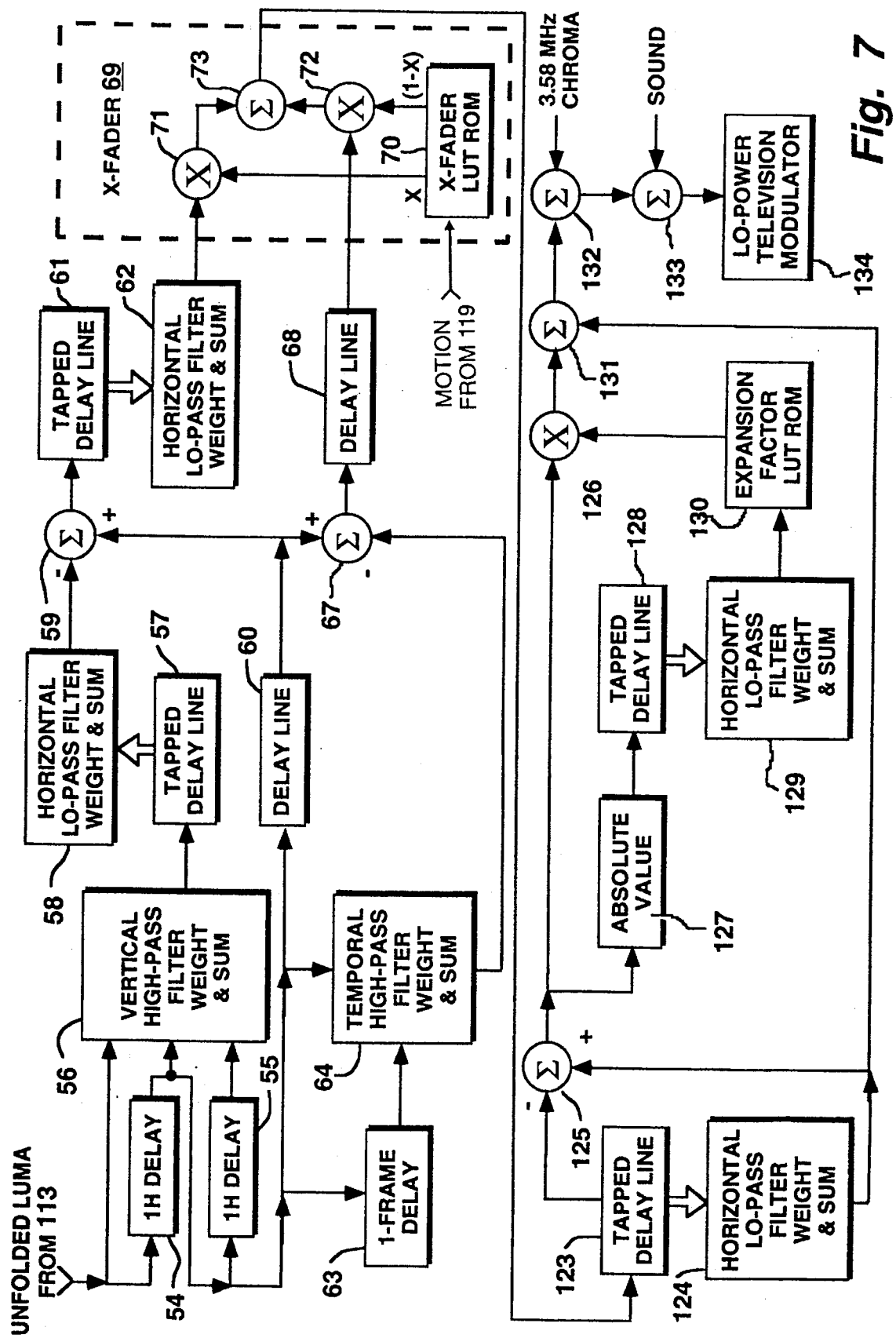
FIG. 7 is a schematic diagram of video tape recorder playback electronics that process the unfolded luminance signal to undo the de-emphasis of components in a higher-frequency (e.g., above 2.5 MHz) band done in the recording procedure, that combine the resulting luminance signal with the chrominance sidebands remodulated back onto a suppressed 3.58 MHz color subcarrier in FIG. 5 circuitry and thus generate a composite video signal, and that modulate a television band radio-frequency carrier with the composite video signal and a sound subcarrier in substantial accordance with NTSC standards.

The record/playback switch arranges (by connections of poles thereof not explicitly shown in the drawing) that elements 54–69, the same elements used for motion-adaptive spatio-temporal filtering when recording, also provide a motion-adaptive spatio-temporal filter 110 used during playback in a connection shown in FIG. 7. The motion-adaptive spatio-temporal filter 110 suppresses the folded-luminance components remnant in the baseband after the unfolding procedure described above, as well as "undoing" the motion-adaptive spatio-temporal filtering performed during recording. The motion-adaptive spatio-temporal filter 110 requires for its operation that the MOTION signal used in the video tape recording procedure be recovered and supplied thereto during the video tape playback procedure. The recovery of MOTION signal and the regeneration of color subcarrier modulation components surrounding a suppressed 3.58 MHz color subcarrier, as done during playback, are described immediately hereafter, with reference to FIG. 5.

An analog-to-digital converter 111 samples, at the 10.2 MHz master clock rate, the color-under carrier as supplied from the playback amplifier 4 shown in FIG. 1. The converter 111 supplies the digitized color-under carrier to a time-base corrector circuit 112. The resulting time-base-corrected, digitized color-under carrier is supplied to a quadrant-selective filter 113. The quadrant-selective filter 113 is a non-separable, two-dimensional spatial filter that comprises tapped digital delay lines and a weight-and-sum circuit arranged for implementing a two-dimensional kernel function for filtering three successive scan lines of digitized color-under carrier at the 10.2 MHz master clock sampling rate.

Figure 6:
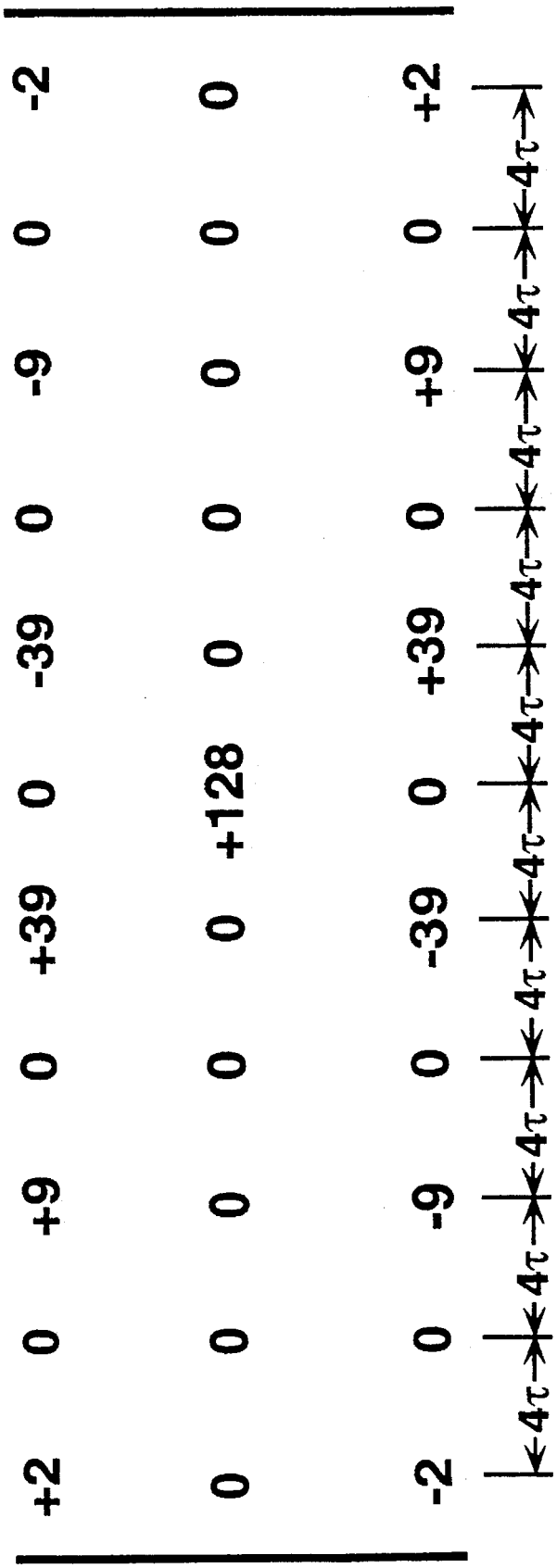
FIG. 6 is a diagram of the kernel of weights used in the quadrant-selective filter of FIG. 5.

FIG. 6 diagrams this two-dimensional kernel function. The filter kernel is of such breadth in the direction of horizontal scan that only every fourth column of coefficients is shown. The intervening columns of coefficients are all columns of zero-valued coefficients. The response of the quadrant-selective filter 113 is M signal during odd fields and is C signal during even fields.

A subcontracter 114 generates a complementary quadrant-selective filter response by subtracting the response of the quadrant-selective filter 113 from the time-base-corrected, digitized color-under carrier supplied from the time-base corrector 112 and provided suitable compensating delay by digital delay line 115. This compensating delay equals the delay through the quadrant-selective filter 113 and can be obtained using the tapped digital delay lines in filter 113. The complementary quadrant-selective filter response is C signal during odd fields and is M signal during even fields.

A multiplexer 116 is conditioned by the least-significant bit of the FIELD COUNT signal supplied thereto as its control signal to select from the quadrant-selective filter response and the complementary quadrant-selective filter response, to generate a C signal separated from M signal, and to generate an M signal separated from C signal. An absolute-value circuit 117 rectifies the M signal, and the rectified M signal is applied to the multiply-tapped digital delay line 118. The signals from the taps of the delay line 118 are applied to a weight-and-sum circuit 119, which implements horizontal low-pass filtering of the rectified M signal to regenerate the MOTION signal required by the motion-adaptive spatio-temporal filter 110.

The C signal separated from M signal is supplied from the multiplexer 116 to a four-quadrant digital multiplier 120, there to be multiplied for the duration of each scan line by the phase of the four-phase 4.21 MHz carrier wave selected to it as multiplier signal by the carrier-phase selection circuitry 83, thereby to regenerate a digitized chroma signal comprising color subcarrier modulation components surrounding a suppressed 3.58 MHz color subcarrier and their image components around 7.8 MHz. This digitized chroma signal is supplied as input signal to a multiply-tapped digital delay line 121. A weight-and-sum circuit 122 weights signals from the taps of the delay line 121 so as to implement a horizontal low-pass filter providing color subcarrier modulation components surrounding a suppressed 3.58 MHz color subcarrier, which filter response is free from image components around 7.8 MHz. Alternatively, the digital delay line 121 and weight-and-sum circuit 122 can be replaced by a multiply-tapped digital delay line and a weight-and-sum circuit that implement a digital band-pass filter with 3.58 MHz center frequency. The delay line 121 and weight-and-sum circuit 122 may be arranged by suitable record/playback switching to be the same as the delay line 88 and weight-and-sum circuit 89 used during recording.

FIG. 7 shows elements 54–64 and 67–69 which by suitable record/playback switching (not explicitly shown) are arranged to provide the motion-adaptive spatio-temporal filter 110 of FIG. 5. Usage of the elements 54–64 and 67–69 during both recording and playback provides substantial savings in hardware costs by eliminating one frame store and some line stores. Applying the entirety of the frame-to-frame difference in luminance signal, supplied from the weight-and-sum circuit 64, to the subtractor 67 as its subtrahend signal to be subtracted from luminance signal supplied as its minuend signal from the delay line 60 removes components all the way down in spatial frequency to zero Hz. This is done reflective of the facts: (1) that the folded-luminance components extend further down in frequency than chrominance components; and (2) that such frame combing, which is only possible when MOTION signal is derived otherwise than as shown in FIG. 3, provides a 3 dB reduction of low-spatial-frequency components. During playback the cross-fader 69 is controlled by the regenerated MOTION signal supplied from the weight-and-sum circuit 119 of FIG. 5. During the scanning of portions of the television image in which there is considerable motion, the cross-fader 69 selects spatially filtered luminance as its luminance output signal, as supplied from the line-combing spatial filter comprising elements 54–62. This spatial filter provides vertical low-pass filtering that suppresses the folded-luminance components remnant in the baseband after unfolding, which remnant components change in polarity from line to line. During the scanning of portions of the television image in which there is little or no motion, the cross-fader 69 selects temporally filtered luminance as its luminance output signal, as supplied from the frame-combing temporal filter comprising elements 54, 60, 66, 64, 67 and 68. The frame combing suppresses the folded-luminance components remnant in the baseband after unfolding, which remnant components change in polarity from frame to frame.

If during recording the high-frequency band of the full-band luminance signal supplied from the cross-fader 69 was de-emphasized respective to its low-frequency band, the de-emphasis is removed in circuitry comprising elements 123–131. The removal is done after separating this luminance signal into low-frequency and high-frequency bands with filters having low-pass and high-pass responses with a cross-over frequency of 2.52 Mhz or one-quarter master clock sampling rate. The luminance signal supplied during playback from the cross-fader 69 in FIG. 5 is supplied to a tapped digital delay line 123 in FIG. 7. The signals from the taps of the delay line 123 are applied to a weight-and-sum circuit 124, which implements the horizontal low-pass filtering that separates the low-frequency band component of luminance. A digital subtractor 125 subtracts the horizontal low-pass filter response supplied by the weight-and-sum circuit 124 from suitably delayed full-band luminance signal taken from the tapped digital delay line 123, which implements the horizontal high-pass filtering that separates the high-frequency band component of luminance.

A two-quadrant digital multiplier 126 multiplies the high-frequency band component of luminance by factors greater than one to de-compress that band and to restore it to its original amplitude vis-à-vis the low-frequency band component of luminance. The multiplication factor is determined as follows. An absolute-value circuit 127 rectifies the high-frequency band component of luminance supplied as difference signal from the subtractor 125. The rectified high-frequency band component of luminance is supplied to a tapped digital delay line 128. The signals from the taps of the delay line 128 are applied to a weight-and-sum circuit 129. The circuit 129 supplies a low-pass filter response to the rectified high-frequency band component of luminance, which response addresses a read-only memory 130 that stores the multiplier signals supplied to the multiplier 126 to de-compress the high-frequency band component of luminance. The decompressed high-frequency band component of luminance, supplied by the multiplier 126 as its product signal, is summed in a digital adder 131 with the low-frequency band component of luminance, supplied from the weight-and-sum circuit 124. The sum signal from the adder 131 is a fully recovered luminance signal.

A digital adder 132 sums this signal with the chrominance signal having a suppressed 3.58 MHz color carrier, as supplied from the weight-and-sum circuit 122 of FIG. 5. A digital adder 133 sums the sum signal from the adder 132 with a sound subcarrier to generate the modulating signal for a low-power television modulator 134 used to generate television radio-frequency signals for application to a color television receiver used for viewing playback from a video tape recording. The sound signal used to frequency-modulate the sound subcarrier is either one that a stationary audio playback head recovers from a lateral sound track on the video tape recording or one that by helical scanning wide-gap audio playback heads in the rotating headwheel assembly recover from a deeply recorded diagonal sound track on the video tape recording.

If during recording the high-frequency band of the full-band luminance signal supplied from the cross-fader 69 was not de-emphasized respective to its low-frequency band, the circuitry comprising elements 123–131 can be replaced by a direct connection from the adder 73 to the adder 132.

The sub-pixel phase reference signal(s) may comprise selected scan lines of repeated pseudo-random pulse sequences, which scan lines occur during selected vertical trace intervals or within the portions of the image just thereafter which are masked so as not to be seen by a television viewer. Generally, the use of repeated pseudo-random pulse sequences for time reference signals is well-known. See, for example, pages 147–148 of W. Peterson's book Error Correcting Codes, MIT Press, 1961; pages 655–657 of P. Horowitz's and W. Hills's book The Art of Electronics, 2nd edition, Cambridge University Press, 1989; pages 439–443 of F. G. Stremler's book Introduction to Communications Systems, 3rd edition, Addison-Wesley Publishing Co., Reading Mass., 1990; or the inventor's and others' U.S. Pat. No. 4,912,549 issued 27 Mar. 1990, entitled "VIDEO SIGNAL SYNCHRONIZATION SYSTEM AS FOR AN EXTENDED DEFINITION WIDESCREEN TELEVISION SIGNAL PROCESSING SYSTEM" and assigned to RCA Licensing Corporation. The pseudo-random pulse sequence is a string of −1 and +1 samples N in number which exhibits a correlation of N with itself and correlations of unit value with its phase-shifted self.

Figure 8:
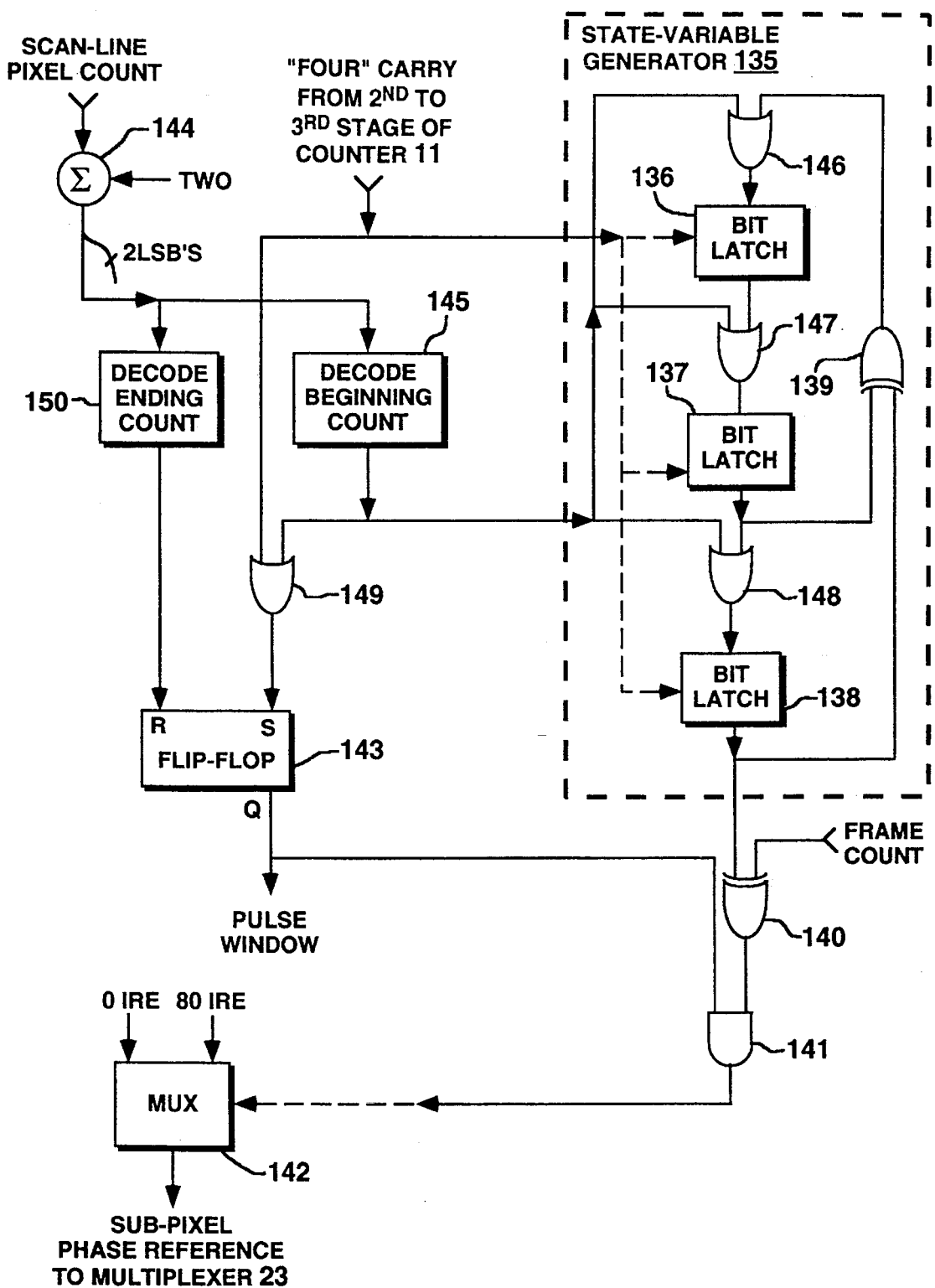
FIG. 8 is a schematic diagram of a sub-pixel phase reference generator, constructed as a state machine and suited for inclusion in the FIG. 1 video tape recorder electronics.

FIG. 8 shows circuitry suitable for the sub-pixel phase reference generator 24 in the FIG. 1 video tape recorder electronics. The FIG. 8 circuitry includes a state-variable generator 135 that generates fifteen consecutive pseudo-random pulse sequences each seven samples long, the duration of each of these samples being four times the interval between master oscillator 10 clock pulses, so as to keep the bandwidth of the pseudo-random pulse pulses well within the bandwidth of the video recording and playback procedures. The state-variable generator 135 includes three clocked bit latches 136, 137, and 138 for generating respective ones of three state variables. Each of the bit latches 136, 137, and 138 is clocked with the carry signal from the second stage of the FIGURE I nine-stage binary counter 11 as generated every fourth master oscillator 10 clock pulse, so the samples of the three state variables each have durations which are each four times the interval between master oscillator 10 clock pulses. An exclusive-OR gate 139 receives state variables from the latches 137 and 138 as its two input signals and supplies its output signal as the input signal to the bit latch 136. The pseudo-random pulse sequences supplied by the state-variable generator 135 issue from the bit latch 138 and are applied as input signal to an exclusive-OR gate 140, which gate receives as the other of its two input signals the modulo-two FRAME COUNT. During odd frames XOR gate 140 response generates the negative of the pseudo-random pulse sequences generated by the state-variable generator 135, and during even frames XOR gate 140 response simply repeats the pseudo-random pulse sequences generated by the state-variable generator 135.

The response of the XOR gate 140 is supplied as one of the two input signals to an AND gate 141. The AND gate 141 selectively repeats the response of the XOR gate 140 in its own response, which is supplied as control signal to a multiplexer 142. Depending on whether this control signal is ZERO or ONE, the multiplexer 142 chooses the digital value associated with 0 IRE level or with 80 IRE level, thereby to generate the sub-pixel phase reference signal supplied to the multiplexer 23 in FIG. 1. The other input signal to the AND gate 141 is a PULSE WINDOW signal that is ONE during a period within a horizontal scan line when the pseudo-random pulse sequences are supplied to the multiplexer 142. At the beginning and at the finish of a scan line, when the PULSE WINDOW signal is a ZERO, the response of the AND gate 141 is a ZERO, conditioning the multiplexer 142 to choose the digital value associated with 0 IRE level. The PULSE WINDOW signal corresponds to the set count (Q) output of a set-reset flip-flop 143.

The setting and re-setting of flip-flop 143 proceeds as follows. The SCAN-LINE PIXEL COUNT is augmented by two in a digital adder 144 and the two least significant bits of the resulting sum discarded to obtain a sparser count at one-fourth master oscillator 10 clock pulse rate, which sparser count increments at times between carry signals from the second stage of the counter 11. A decoder 14,5 decodes a beginning sparser count (e.g., sixteen, corresponding to a SCAN-LINE PIXEL COUNT of sixty-two) to generate a ONE supplied to OR gates 146-149. The ONE responses of the OR gates 147,148 and 149 are supplied to the bit latches 136, 137 and 138, respectively, to be clocked thereinto so that the initial pseudo-random pulse sequence always begins with ONEs in all the bit latches 138, 137 and 138. The ONE response of the OR gate 149 is supplied as a set pulse for the flip-flop 143, which flip-flop in its set state enables the AND gate 141 to supply pseudo-random pulse sequences to the multiplexer 142. A decoder 150 decodes a finishing sparser count (e.g., one hundred twenty, corresponding to a SCAN-LINE PIXEL COUNT of four hundred seventy-eight) to generate a reset pulse for the flip-flop 143. In its reset state, the flip-flop 143 disables the AND gate 141, so it can no longer supply pseudo-random pulse sequences to the multiplexer 142.

The connections described above lead to the following cycle of operation, which repeats fifteen times during the period that the flip-flop 143 is set, generating a ONE as PULSE WINDOW signal.

| LATCH 136 STATE | LATCH 137 STATE | LATCH 138 STATE |
|---|---|---|
| 1 | 1 | 1 |
| 0 | 1 | 1 |
| 0 | 0 | 1 |
| 1 | 0 | 0 |
| 0 | 1 | 0 |
| 1 | 0 | 1 |
| 1 | 1 | 0 |

The 1110010 sequence supplied from the latch 138 may be considered representative of the two's complement pseudo-random pulse sequence 11,11,11,01,01,11,01 with the unchanging ONE least-significant bit suppressed.

Figure 9:
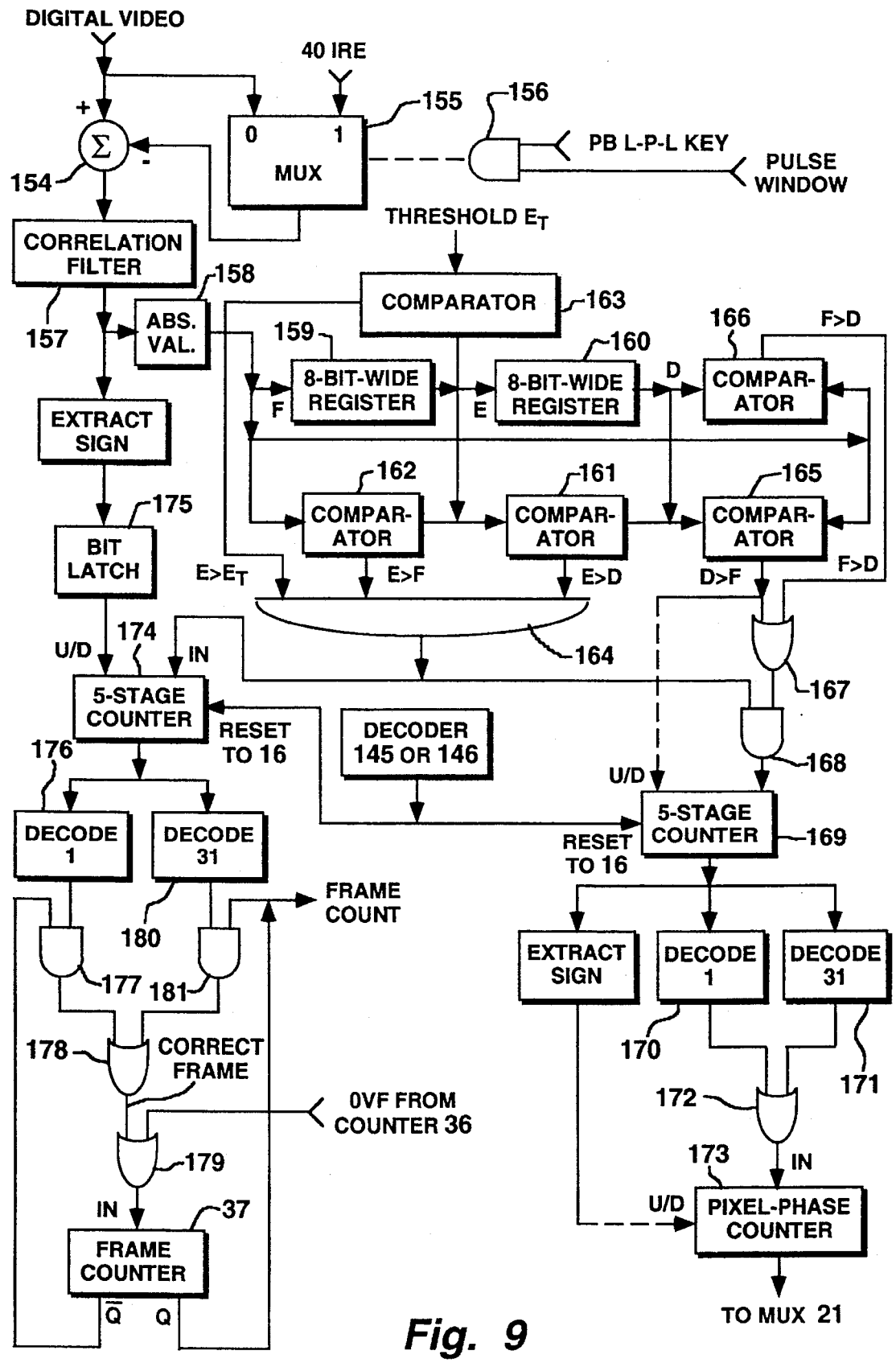
FIG. 9 is a schematic diagram of sub-pixel phase control circuitry, suitable for inclusion in the FIGURE I video tape recorder electronics.

FIG. 9 shows circuitry suitable for the sub-pixel phase control circuitry 20 in the FIGURE I video tape recorder electronics. A digital subtractor 154 receives, as its subtrahend input signal, the digitized signal from the FIGURE 1 analog-to-digital converter 7. A multiplexer 155 supplies the minuend signal for the subtractor 154. An AND gate 156 responds with a ONE to the P-B L-P-L KEY signal generated by the FIG. 2 AND gate 41 and the PULSE WINDOW signal generated by the FIG. 8 flip-flop 143 concurrently being ONEs, thereby to condition the multiplexer 155 to select the digital value associated with a 40 IRE level as minuend signal for the subtractor 154, which biases the pseudo-random pulse sequences so as to have a zero-valued direct component.

During most scan lines, when the P-B L-P-L KEY signal is ZERO, and during the beginning and finish of those once-in-a-frame scan lines, when the P-B L-P-L KEY signal is ONE but the PULSE WINDOW signal is ZERO, the AND gate 156 responds with a ZERO, conditioning the multiplexer 155 to select the digitized signal from the FIG. 1 analog-to-digital converter 7 as minuend signal for the subtractor 154. The subtractor 154 generates a zero-valued digital difference signal responsive to its subtrahend and minuend signals being the same.

A 28-sample correlation filter 157 receives from the subtractor 154 the pseudo-random pulse sequences biased so as to have a zero-valued direct component. When the correlation is best between the input signal and the filter kernel, or when anti-correlation is best between the input signal and the filter kernel, the filter 157 correlation response will be twenty-eight times as large as the signal supplied thereto from the subtractor 154 and thus will have five more bits than the digitized signal from the analog-to-digital converter 7. The filter 157 response will be thirteen bits wide, assuming the ADC 7 digitizes with eight bits resolution. To conserve hardware, the four least-significant of these bits are not used in the subsequent circuitry. The filter 157 response is supplied to an absolute-value circuit 158, to generate a one-bit-narrower absolute-value correlation response that is supplied to a cascade connection of parallel-bit registers 159 and 160. The cascade connection of parallel-bit registers 159 and 160 provides a three-tap delay that permits three consecutive correlation responses to be considered at a time. When circular correlation of the correlation filter 157 kernel and the pseudo-random pulse sequence from the subtractor 154 is reached, the response of the filter 157 exhibits a positive peak that extends over more than one sample at master oscillator clocking rate, owing to the fact that the pseudo-random pulse rate is one-quarter the master oscillator clocking rate. When circular anti-correlation of the correlation filter 157 kernel and the pseudo-random pulse sequence from the subtractor 154 is reached, the response of the filter 157 exhibits a negative peak that extends over a similar small number of samples. The peak can be considered to extend over seven samples, or over just five samples.

In any case, three consecutive ones of these samples will be considered to constitute the tip of the peak, and analysis of the three samples at each tip of a correlation peak (or anti-correlation peak) is used to determine how closely the timing of the digitization process by the analog-to-digital converter 7 during playback corresponds to the timing of the digitization process by the analog-to-digital converter 7 during recording. If the correspondence is perfect, the two samples preceding and succeeding the maximum-amplitude very-tip sample will be of equal amplitudes somewhat smaller than the maximum-amplitude sample that they flank. If the timing of the digitization process by the analog-to-digital converter 7 during playback leads the timing of the digitization process by the analog-to-digital converter 7 during recording, the sample preceding the maximum-amplitude very-tip sample is smaller in amplitude than the sample succeeding the maximum-amplitude sample. If the timing of the digitization process by the analog-to-digital converter 7 during playback lags the timing of the digitization process by the analog-to-digital converter 7 during recording, the sample preceding the maximum-amplitude very-tip sample is larger in amplitude than the sample succeeding the maximum-amplitude sample.

The current sample D from the register 160, the current sample E from the register 159 and the current sample F from the absolute-value circuit 158 are the three consecutive correlation responses that are considered at any one time. A digital comparator 161 generates a ONE when and only when E>D; a digital comparator 162 generates a ONE when and only when E>F; and a digital comparator 163 generates a ONE when and only when $E>E_T$, where $E_T$ is a prescribed positive threshold value. An AND gate 164 responds to the three comparators 161–163 all generating ONEs at the same time with a ONE indicative that the current sample E is a maximum-amplitude, very-tip sample.

A digital comparator 165 generates a ONE when and only when D>F, indicating that the timing of the digitization process by the analog-to-digital converter 7 during playback leads the timing of the digitization process by the analog-to-digital converter 7 during recording. A digital comparator 166 generates a ONE when and only when F>D, indicating that the timing of the digitization process by the analog-to-digital converter 7 during playback lags the timing of the digitization process by the analog-to-digital converter 7 during recording. An OR gate 167 receives the output signals from the comparators 165 and 166 as its input signals and generates a ZERO when and only when D=F, indicating that the timing of the digitization process by the analog-to-digital converter 7 during playback properly corresponds to the timing of the digitization process by the analog-to-digital converter 7 during recording. (Each of the digital comparators 161–163, 165 and 166 is of a general type generating a ONE when and only when an A input signal thereto exceeds a B input signal thereto. Such a comparator is provided by a digital subtractor receiving its A and B input signals as two's complement subtrahend and minuend signals, respectively, with the sign of the difference providing the comparison result.)

An AND gate 168 responds to AND gate 164 generating a ONE indicative that the current sample E is a maximum-amplitude sample and to OR gate 167 generating a ONE indicative that the current D and F samples differ in amplitude to generate a ONE that is an indication of a need to correct the phasing of luminance pixels during playback. A five-stage up/down binary counter 169 counts the number of these indications. The counter 169 is reset to an initial value of sixteen by the decoder 145 or the decoder 146 output signal pulsing to ONE. The output signal from the comparator 165 controls the direction of counting by the counter 169.

When the timing of the digitization process by the analog-to-digital converter 7 during playback leads the timing of the digitization process by the analog-to-digital converter 7 during recording, the counter 169 counts down, responsive to the comparator 165 output signal being a ONE. When the timing of the digitization process by the analog-to-digital converter 7 during playback lags the timing of the digitization process by the analog-to-digital converter 7 during recording, the counter 169 counts up, responsive to the comparator 165 output signal being a ZERO.

An OR gate 172 responds, either to a one count from the counter 169 being detected by a decoder 170 or to a thirty-one count from the counter 169 being detected by a decoder 171, to generate a ONE. During playback this ONE alters by one the count in an up/down binary counter 173, used to control the multiplexer 21 shown in FIGURE 1 as selecting the tap of the tapped digital delay line 19 from which the master oscillator clocking pulse is taken for application to the analog-to-digital converter 7. The counter 169 receives the most-significant or "sign" bit from the counter 169 count as its up/down control signal. Accordingly, the thirty-one count from the counter 169, indicative of fifteen consecutive indications of leading luminance-pixel phase during playback, causes the count from the counter 173 to increment by one, in turn causing the multiplexer 21 to select the master oscillator clocking pulses applied to the analog-to-digital converter 7 from a next-later tap on the multiply-tapped digital delay line 19. And the one count from the counter 169, indicative of fifteen consecutive indications of lagging luminance-pixel phase during playback, causes the count from the counter 173 to decrement by one, in turn causing the multiplexer 21 to select the master oscillator clocking pulses applied to the analog-to-digital converter 7 from a next-earlier tap on the multiply-tapped digital delay line 19.

During recording, the counter 173 is continuously reset to arithmetic zero, to force the multiplexer 21 to select a middle tap of the multiply-tapped digital delay line 19.

FIG. 9 also shows how the modulo-two frame counter 37 (also shown in FIG. 2) is arranged to be correctly phased during playback, so the pattern of luminance pixel sampling corresponds to that used during recording. An up/down binary counter 174 counts the number of positive or negative peaks in the correlation function during a scan line when P-B L-P-L KEY signal is ONE. Like the counter 169, the counter 174 is reset to an initial value of sixteen by the decoder 145 or the decoder 146 output signal pulsing to ONE. The pulsing of the AND gate 164 response to ONE, signaling sample E being a very-tip sample in the correlation response, is counted by counter 174. The sign bit of the response from the correlation filter 157 is extracted and is delayed one pixel duration in a bit latch 175 clocked at the 10.2 MHz master clock oscillator pulse rate. The bit temporarily stored in the bit latch 175 corresponds to the sign of the sample having sample E as its absolute value, is temporally aligned with sample E, and controls the direction of counting by the counter 174.

During a scan line in an odd frame which scan line spans a period when P-B L-P-L KEY signal is ONE, the response from the correlation filter 157 should have fifteen negative-going peaks. Accordingly, the bit temporarily stored in the bit latch 175 should be a ONE when the counter 174 counts each very-tip sample, which up/down signal from the bit latch 175 conditions the counter 174 for counting downward. Supposing the counter 174 counts downward by fifteen from its initial value of sixteen, a decoder 176 detects the resulting one count to generate an indication that FRAME COUNT should be odd, or ONE. An AND gate 177 ANDs the decoder 176 output signal with the complement of FRAME COUNT to generate a ONE indicating when FRAME COUNT is even when it should be odd. An OR gate 178 responds to any ONE generated by the AND gate 177 to generate a ONE as CORRECT FRAME signal for application via the OR gate 179 as a count input signal to the counter 174 to exchange the logic states of its modulo-two count output signal FRAME COUNT and its other modulo-two count output signal that is the complement of FRAME COUNT.

During a scan line in an even frame which scan line spans a period when P-B L-P-L KEY signal is ONE, the response from the correlation filter 157 should have fifteen positive-going peaks. Accordingly, the bit temporarily stored in the bit latch 175 should be a ZERO when the counter 174 counts each very-tip sample, which up/down signal from the bit latch 175 conditions the counter 174 for counting upward. Supposing the counter 174 counts upward by fifteen from its initial value of sixteen, a decoder 180 detects the resulting thirty-one count to generate an indication that FRAME COUNT should be even, or ZERO. An AND gate 181 ANDs the decoder 180 output signal with FRAME COUNT to generate a ONE indicating when FRAME COUNT is odd when it should be even. The OR gate 178 responds to any ONE generated by the AND gate 181 to generate a ONE as CORRECT FRAME signal for application via the OR gate 179 as a count input signal to the counter 174 to exchange the logic states of its modulo-two count output signal FRAME COUNT and its other modulo-two count output signal that is the complement of FRAME COUNT.

Figure 10:
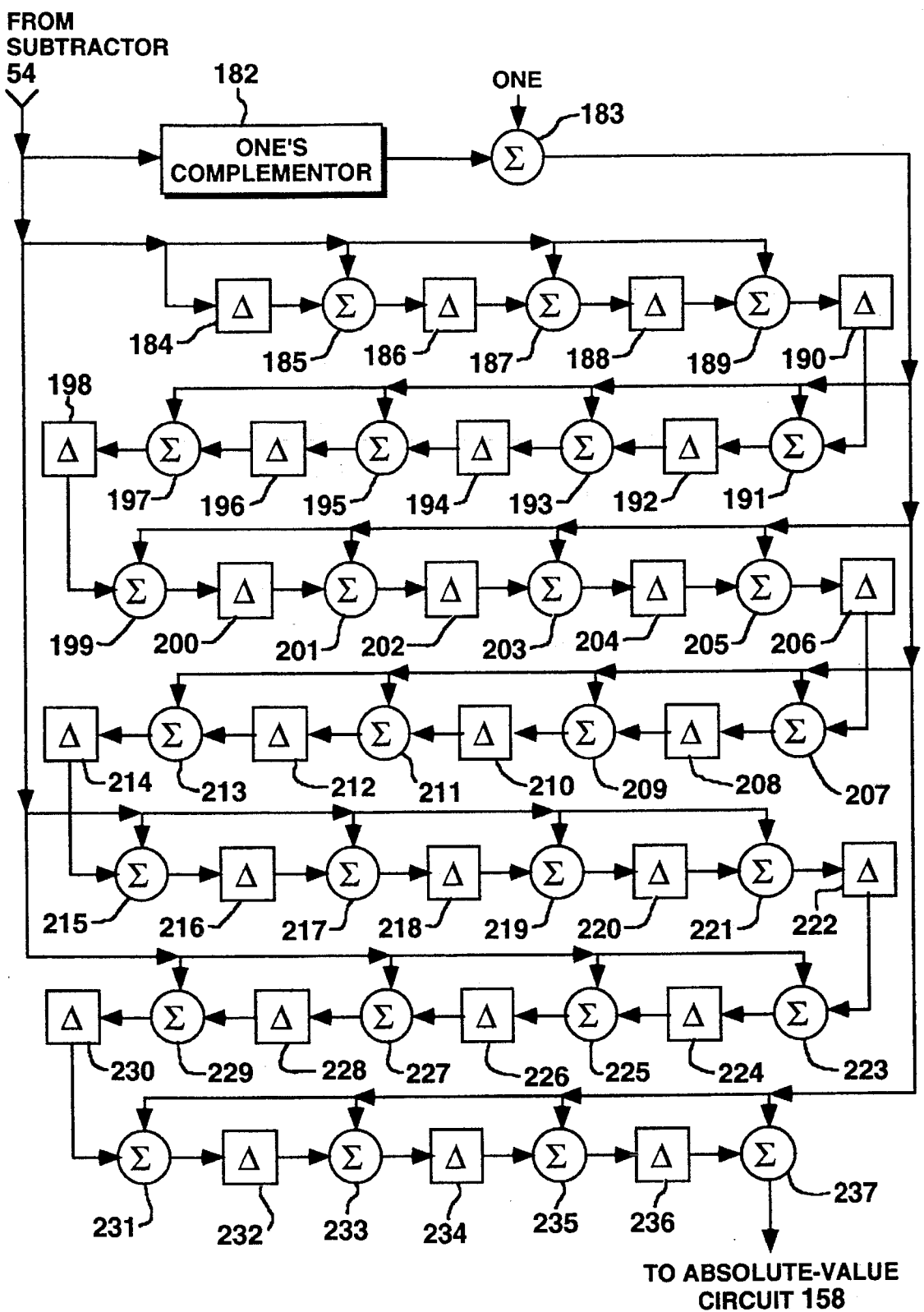
FIG. 10 is a schematic diagram of one form of correlation filter that can be used in the FIG. 9 sub-pixel phase control circuitry.

FIG. 10 shows a representative structure for the FIG. 9 correlation filter 157, which digital filter structure is of the input-weighted type, with +1 and −1 filter coefficients. The two's complement input signal to the correlation filter from the subtractor 154 is input-weighted by the filter coefficient −1 by complementing each of its bits in a one's complementor circuit 182 and using a digital adder 183 for adding arithmetic one to the output signal from the one's complementor circuit 182. A 28-tap digital delay line is formed from elements 184–237, the even-numbered ones of these elements being word latches clocked by the 10.2 MHz master clock oscillator pulses and the odd-numbered ones of these elements being digital adders each receiving its addend from the word latch with next lower numbering than its own. Each of the adders in this 28-tap digital delay line except adder 237 supplies its sum signal to the word latch with next lower numbering than its own. The two's complement input signal to the correlation filter from the subtractor 154 is inherently input-weighted by the filter coefficient +1, is supplied to the word latch 184 at the beginning of the 28-tap digital delay line, and is applied as augend input signal to each of the digital adders 191, 187, 189,215,217,219,221, 223,225,227 and 229. The two's complement input signal to the correlation filter from the subtractor 154, as input-weighted by the filter coefficient −1, is supplied as sum signal from the adder 183 and is applied as augend input signal to each of the digital adders 191, 193, 195,197,199, 201,203,205,207,209. 211,213, 231,233,235 and 237. The adder 237 supplies its sum signal, as the response of the correlation filter 157 to the absolute-value circuit 158.

Referring back to FIG. 4, there are numerous alternative circuits that may replace the balanced modulator circuit comprising elements 98–101,104 and 105. Elements 98 and 99 are the equivalent of a digital subtractor with a wired two as subtrahend. Elements 98–101 are often considered together as a group, forming a digital adder/subtractor that adds its data input signals responsive to a ZERO control signal and that subtracts one of its data input signals from the other responsive to a ONE control signal.

Figure 11:
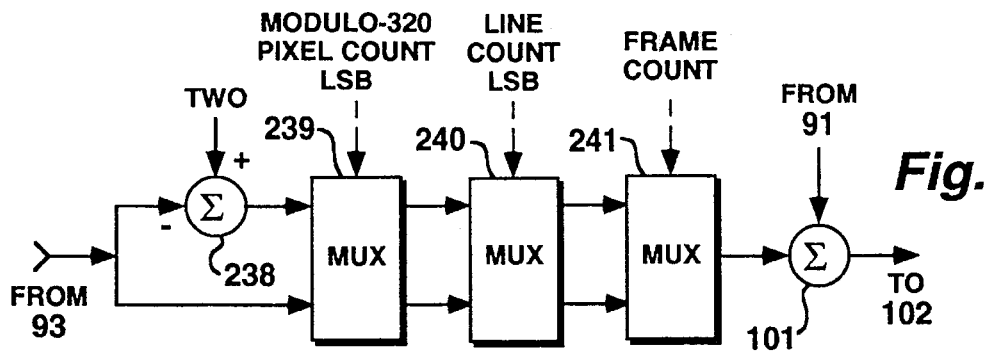
FIGS. 11–18 show various alternative forms of balanced modulator that can replace that specifically shown in FIG. 4.
Figure 12:
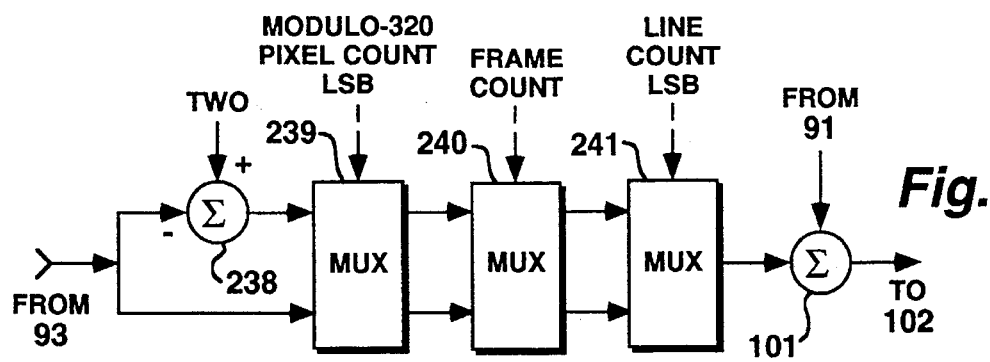

FIGS. 11–14 each show a balanced modulator alternative to that shown in FIG. 4, in which elements 98 and 99 are replaced by the equivalent digital subtractor 238 with a wired two as subtrahend, in which the XOR gates 104 and 105 are not used, and in which the multiplexer 100 is replaced by a cascade of three multiplexers, the first two of which 239 and 240 are of "double-pole-double-throw switch" type and the last of which 240 is of "single-pole-double-throw switch" type. In FIGS. 11 and 12 the first multiplexer 239 reverses the polarities of its output signals responsive to the least-significant bit of the MODULO-320 PIXEL COUNT. In FIG. 11 the second multiplexer 240 reverses the polarities of its output signals responsive to LINE COUNT, and the third multiplexer 241 reverses the polarities of its output signals responsive to FRAME COUNT; in FIG. 12 the second multiplexer 240 reverses the polarities of its output signals responsive to FRAME COUNT, and the third multiplexer 241 reverses the polarities of its output signals responsive to LINE COUNT. It is advantageous from the standpoint of the power consumption attendant with the switching of the multiplexers 239,240 and 241 that multiplexer 241 which is of "single-pole-double-throw switch" type be the fastest switched.

Figure 13:
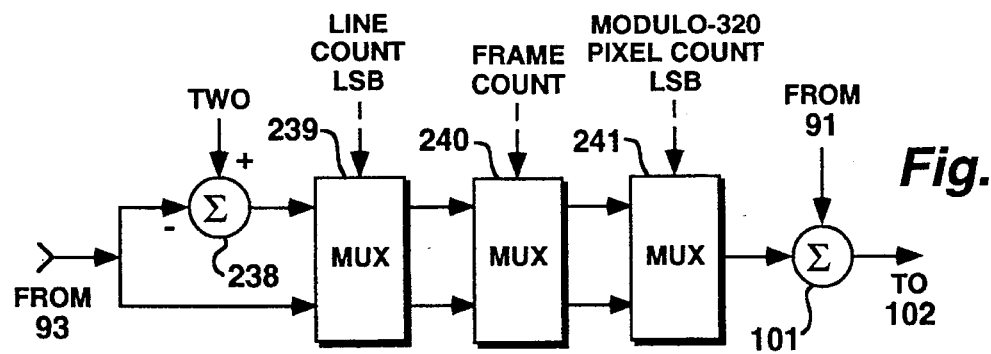
Figure 14:
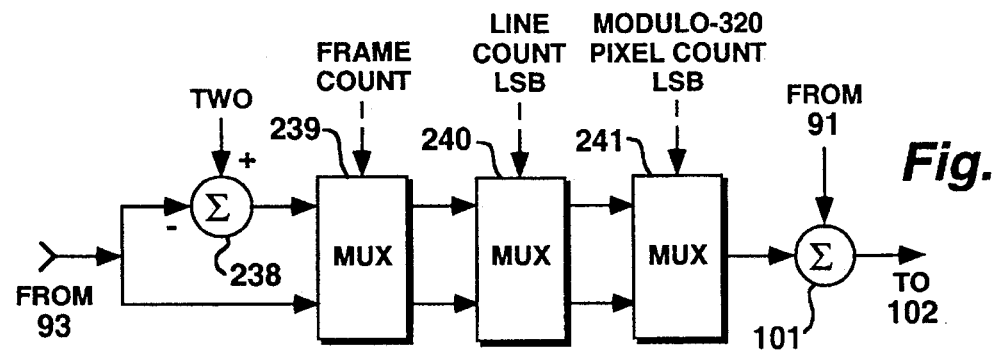

FIGS. 13 and 14 show the MODULO-320 PIXEL COUNT controlling the switching of the third multiplexer 241. In FIG. 13 the first multiplexer 239 reverses the polarities of its output signals responsive to LINE COUNT, and the second multiplexer 240 reverses the polarities of its output signals responsive to FRAME COUNT; in FIG. 14 the first multiplexer 239 reverses the polarities of its output signals responsive to FRAME COUNT, and the second multiplexer 240 reverses the polarities of its output signals responsive to LINE COUNT. Two additional permutations of the control signal connections of the multiplexers 239,240 and 241 are possible, in each of which permutations the second multiplexer 240 is controlled by the MODULO-320 PIXEL COUNT. Any cascade of just two of the multiplexers 239,240 and 241 can be replaced by a single multiplexer controlled by exclusively ORing the two of the FRAME COUNT, LINE COUNT, and MODULO-320 PIXEL COUNT signals other than the one controlling the other multiplexer.

In FIGS. 15–18 the balanced modulator is subsumed into the circuitry for combining the low-pass-filtered component and the de-emphasized high-pass-filtered component of the luminance signal during the folding procedure. In each of the FIGS. 15–18 a digital adder 243 additively combines the low-pass-filtered component of the luminance signal, supplied from the weight-and-sum circuit 91, with the de-emphasized high-pass-filtered component of the luminance signal supplied as product output signal from the digital multiplier 93. The digital adder 243 generates a weighted sum of the low-pass-filtered and high-pass-filtered components of the luminance signal, with the low-pass-filtered component accorded a positive weight of one, and with the digital multiplier 93 determining the positive weight accorded to the high-pass-filtered component. In each of the FIGS. 15–18 a digital subtractor 244 receives as its subtrahend input signal the low-pass-filtered component of the luminance signal from the weight-and-sum circuit 91, and receives as its minuend signal the de-emphasized high-pass-filtered component of the luminance signal from the digital multiplier 93. The digital subtractor 244 generates a weighted sum of the low-pass-filtered and high-pass-filtered components of the luminance signal, with the low-pass-filtered component accorded a positive weight of one, and with the digital multiplier 93 determining the negative weight accorded to the high-pass-filtered component. Selection at pixel rate between the adder 243 sum signal and the subtractor 244 difference signal generates folded-luminance signal for application to the record amplifier 102. With regard to the low-pass-filtered component of the luminance signal-supplied from the weight-and-sum circuit 91, which is a single-ended component of the modulating signal, the modulation procedure carried out by the modulation circuitry of any of the FIGS. 15–18 is balanced only insofar as the folding carrier frequency is concerned.

Figure 15:
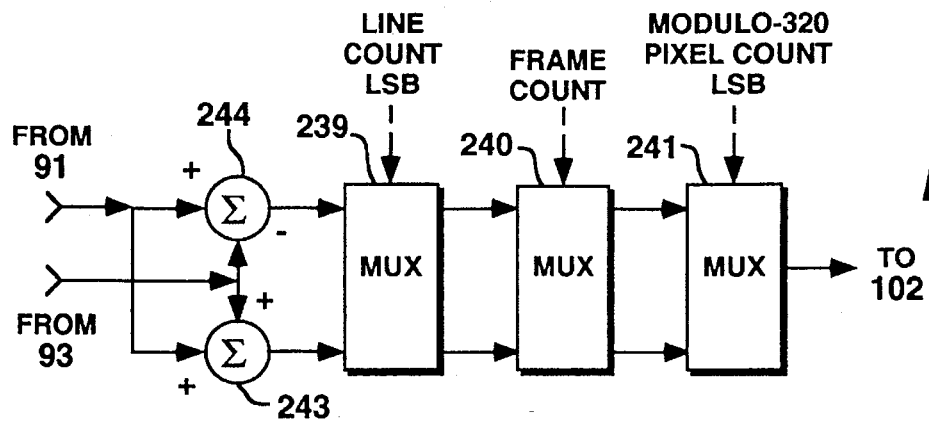
Figure 16:
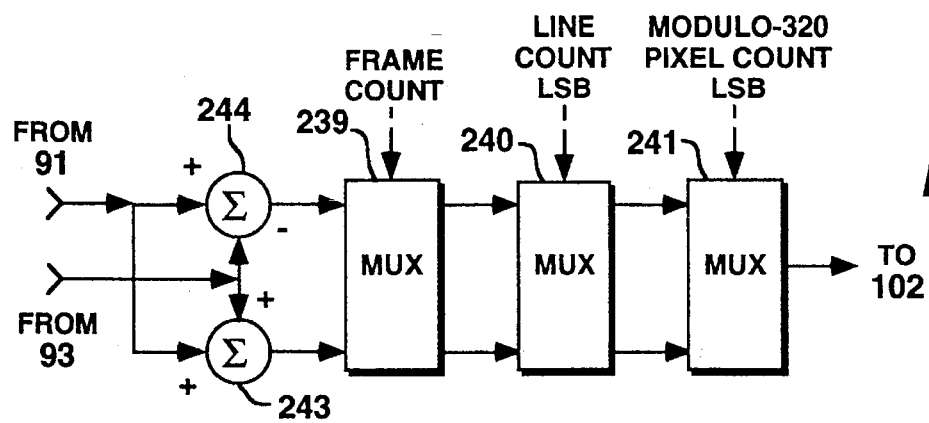

In FIGS. 15 and 16 the selection at pixel rate between the adder 243 sum signal and the subtractor 244 difference signal is done by the cascaded multiplexers 239–241. There are four other permutations of applying the three control signals FRAME COUNT, LINE COUNT LSB, and MODULO-320 PIXEL COUNT LSB to the multiplexers 239–241 in still other embodiments of the invention.

Figure 17:
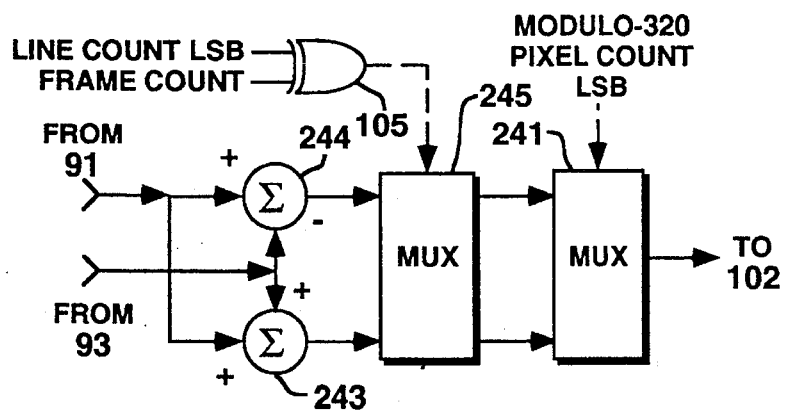

FIG. 17 shows a variant of FIG. 15 (or 16) in which the cascaded multiplexers 239 and 240 are replaced by a single multiplexer 245 controlled by the XOR gate 105 response to control signals FRAME COUNT and LINE COUNT LSB. The cascaded multiplexers 240 and 241 in the FIG. 15 modulator circuitry are replaced by a single multiplexer controlled by the response of an exclusive-OR gate receiving FRAME COUNT and MODULO-320 PIXEL COUNT LSB input signals in another embodiment of the invention not shown in the drawing. In yet another embodiment of the invention not shown in the drawing, the cascaded multiplexers 240 and 241 in the FIG. 16 modulator circuitry are replaced by a single multiplexer controlled by the response of an exclusive-OR gate receiving LINE COUNT LSB and MODULO-320 PIXEL COUNT LSB input signals.

Figure 18:
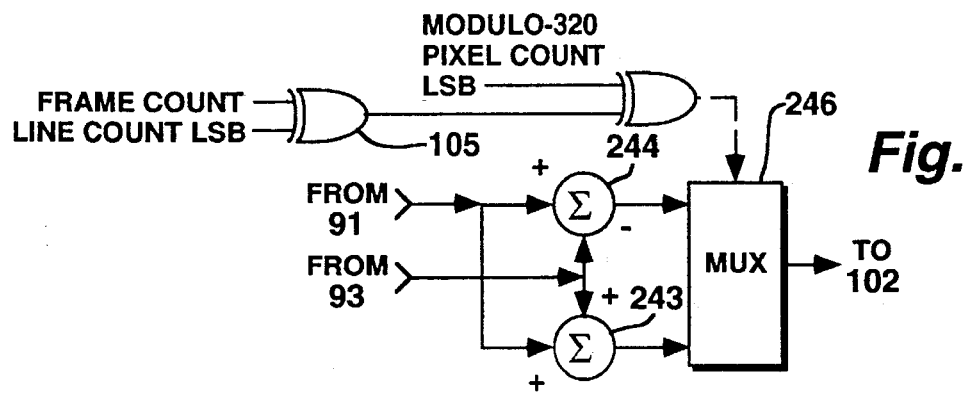

FIG. 18 shows the selection at pixel rate between the adder 243 sum signal and the subtractor 244 difference signal being done by a single multiplexer 246, with selection being controlled by the XOR gates 104 and 105 responsive to the three control signals FRAME COUNT, LINE COUNT LSB, and MODULO-320 PIXEL COUNT LSB.

The operation of the balanced modulator in the video recording system described in U.S. patent application Ser. No. 787,690 for various relationships between the folding frequency and the sampling rate of the luminance signal is illustrated by the frequency spectra of FIGS. 19–24 sharing the same axis of abscissas in frequency, the frequency spectra of FIGS. 25–30 sharing the same axis of abscissas in frequency, and the frequency spectra of FIGS. 31–36 sharing the same axis of abscissas in frequency.

Figure 19:
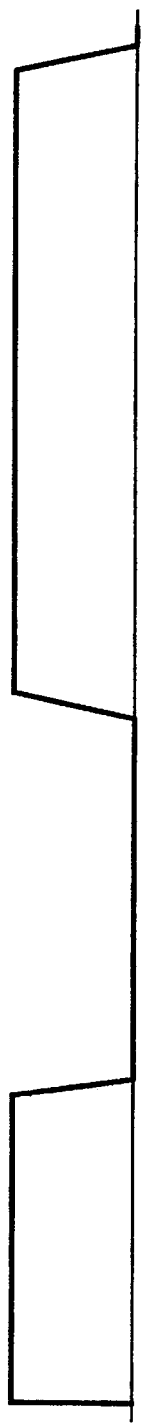
FIGS. 19–24 comprise a set of frequency spectra sharing the same axis of abscissas in frequency, which spectra are descriptive of video tape recorder electronics using folded luminance signals in which digitization is carried out at a rate three times the folding carrier frequency.

FIG. 19 depicts the frequency spectrum of a full-band luminance signal in which digitization is carried out at a rate three times a 5.1 MHz folding carrier frequency. In addition to the baseband subspectrum extending from zero to 5 MHz, there are subspectra that are first-harmonic sidebands of the 15.3 MHz luminance sampling carrier, the lower sideband extending down from 15.3 MHz to 10.3 MHz and the upper sideband extending up from 15.3 MHz to 20.3 MHz. There will also be sidebands flanking the higher harmonics of the sampling carrier, which additional subspectra are not of consequence here and are ignored.

Figure 20:

FIG. 20 depicts the frequency spectrum of the response, of a digital low-pass filter with 2.55 MHz cut-off, to the FIG. 19 full-band luminance signal spectrum in which digitization is carried out at a rate three times the 5.1 MHz folding carrier frequency. In addition to the baseband subspectrum extending from zero to 2.55 MHz, there are subspectra that are first-harmonic sidebands of the 15.3 MHz luminance sampling carrier, the lower sideband extending down from 15.3 MHz to 12.75 MHz and the upper sideband extending up from 15.3 MHz to 17.85 MHz.

Figure 21:

FIG. 21 depicts the frequency spectrum of the response, of a digital high-pass filter with 2.55 MHz cut-off, to the FIG. 19 full-band luminance signal spectrum in which digitization is carried out at a rate three times the 5.1 MHz folding carrier frequency. In addition to the baseband subspectrum extending from 2.55 to 5 MHz, there subspectra that are first-harmonic sidebands of the 15.3 MHz luminance sampling carrier, the lower sideband extending down from 12.75 to 10.3 MHz and the upper sideband extending up from 17.85 to 20.2 MHz.

Figure 22:
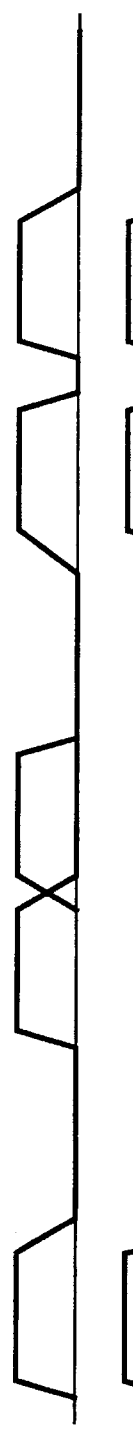

FIG. 22 depicts the frequency spectrum resulting from balanced modulation of a 5.0 MHz folding frequency carrier by the FIG. 21 digital high-pass filter response. The baseband subspectrum extending from 2.55 to 5 MHz is heterodyned by the 5.1 MHz folding frequency carrier to generate a reversed-spectrum lower sideband extending down from 2.55 to 0.1 MHz and to generate an upper sideband extending up from 7.65 to 10.1 MHz. The lower first-harmonic sideband in the 10.3–12.75 MHz band is translated to a 5.2–7.65 MHz band and a 15.4–17.85 MHz band. The upper first-harmonic sideband in the 17.35–20.3 MHz is translated to a 12.25–10.2 MHz band and a 22.45–25.4 MHz band (off the drawing to the right).

Figure 23:

FIG. 23 depicts the frequency spectrum resulting from adding the spectra of FIGS. 20 and 22. There are gaps in the FIG. 23 spectrum in the bands where the FIG. 19 high-pass filter responses reposed. These gaps are 2.5 MHz wide so that a low-pass filter with a cut-off frequency in the 2.55–5.1 MHz range is easily designed to suppress the subspectra in the 5.2–10.1 MHz band and their harmonics.

Figure 24:
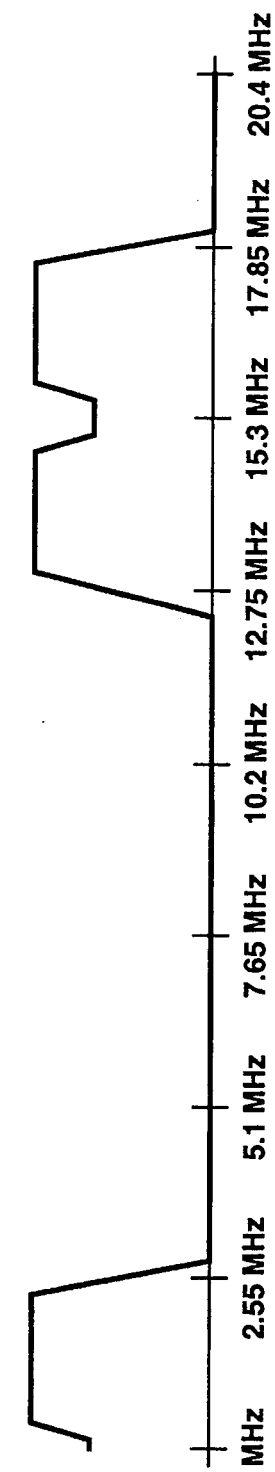

FIG. 24 depicts the frequency spectrum resulting from low-pass filtering the FIG. 23 spectrum, the subspectra of which are converted to analog low-pass filter response by a digital-to-analog converter.

Figure 25:
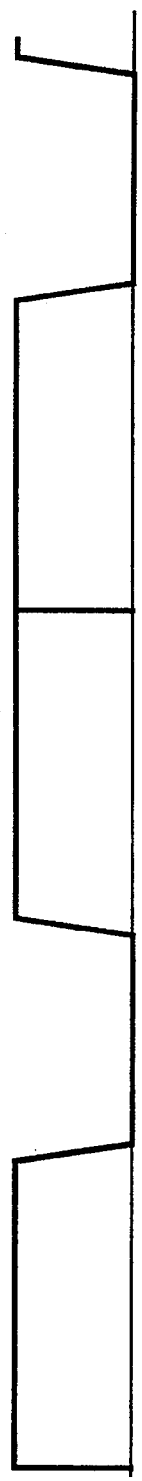
FIGS. 25–30 comprise a set of frequency spectra sharing the same axis of abscissas in frequency, which spectra are descriptive of video tape recorder electronics using folded luminance signals in which digitization is carried out at a rate three times the folding carrier frequency.

FIG. 25 depicts the frequency spectrum of a full-band luminance signal in which digitization is carried out at a rate 2.5 times a 5.1 MHz folding carrier frequency. In addition to the baseband subspectrum extending from zero to 5 MHz, there are subspectra that are first-harmonic sidebands of the 12.75 MHz luminance sampling carrier, the lower sideband extending down from 12.75 MHz to 7.75 MHz and the upper sideband extending up from 12.75 MHz to 17.75 MHz. There will also be sidebands flanking the higher harmonics of the sampling carrier, which additional subspectra are not of consequence here and are ignored.

Figure 26:
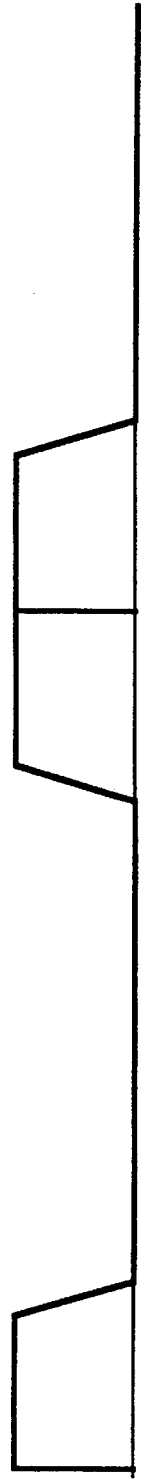

FIG. 26 depicts the frequency spectrum of the response, of a digital low-pass filter with 2.55 MHz cut-off, to the FIG. 25 full-band luminance signal spectrum in which digitization is carried out at a rate 2.5 times the 5.1 MHz folding carrier frequency. In addition to the baseband subspectrum extending from zero to 2.55 MHz, there are subspectra that are first-harmonic sidebands of the 12.75 MHz luminance sampling carrier, the lower sideband extending down from 12.75 MHz to 10.2 MHz and the upper sideband extending up from 12.75 MHz to 15.3 MHz.

Figure 27:

FIG. 27 depicts the frequency spectrum of the response, of a digital high-pass filter with 2.55 MHz cut-off, to the FIG. 25 full-band luminance signal spectrum in which digitization is carried out at a rate 2.5 times the 5.1 MHz folding carrier frequency. In addition to the baseband subspectrum extending from 2.55 to 5 MHz, there subspectra that are first-harmonic sidebands of the 12.75 MHz luminance sampling carrier, the lower sideband extending down from 10.2 to 7.65 MHz and the upper sideband extending up from 15.3 to 17.85 MHz.

Figure 28:
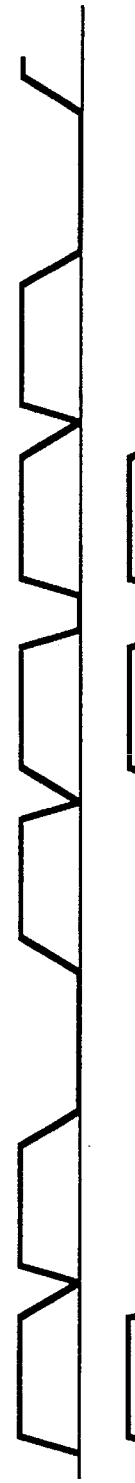

FIG. 28 depicts the frequency spectrum resulting from balanced modulation of the 5.1 MHz folding frequency carrier by the FIG. 27 digital high-pass filter response. The baseband subspectrum extending from 2.55 to 5 MHz is heterodyned by the 5.1 MHz folding frequency carrier to generate a reversed-spectrum lower sideband extending down from 2.55 to 0.1 MHz and to generate an upper sideband extending up from 7.65 to 10.1 MHz. The lower first-harmonic sideband in the 7.65–10.2 MHz band is translated to a 2.55–5.1 MHz band and a 12.75–15.3 MHz band. The upper first-harmonic sideband in the 15.3–17.85 MHz is translated to a 10.2–12.75 Hz band and a 20.4–22.95 MHz band (off the drawing to the right).

Figure 29:

FIG. 29 depicts the frequency spectrum resulting from adding the spectra of FIGS. 26 and 28. There are no gaps in the FIG. 29 spectrum in the bands where the FIG. 27 high-pass filter responses reposed, so that a low-pass filter with a very sharp cut-off frequency of 2.55 MHz is required to suppress the subspectra in the 2.55–5.1 MHz band and their harmonics.

Figure 30:
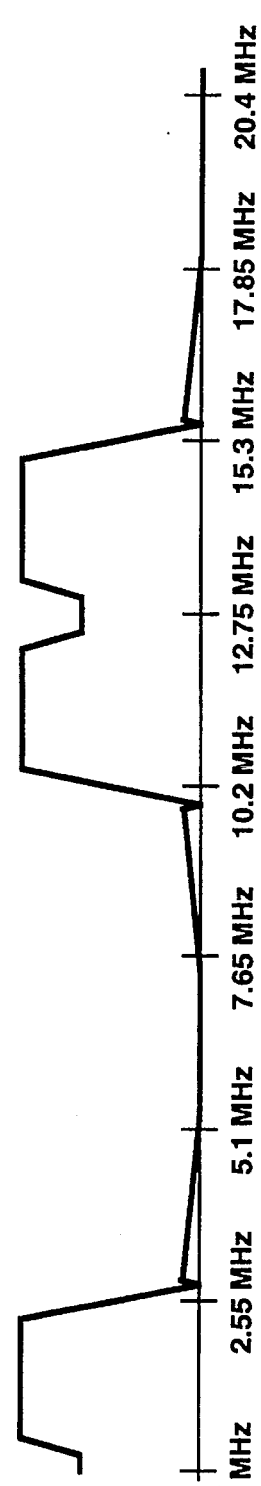

FIG. 30 depicts the frequency spectrum resulting from low-pass filtering the FIG. 29 spectrum, the subspectra of which are converted to analog low-pass filter response by a digital-to-analog converter. The low-pass filtering with a very sharp cut-off frequency of 2.55 MHz tends to make the cross-over from the 0–2.55 MHz portion of the unfolded luminance signal to its 2.55–5.1 MHz portion other than smooth because of the usual loss of some of the energy around the 2.55 MHz cross-over frequency.

As the sampling rate of the luminance signal becomes less than 2.5 times the folding frequency, the subspectra of the high-pass filter response in the baseband and in the lower first-harmonic sideband of the sampling frequency when heterodyned with 5.1 MHz folding carrier generate, by their respective down-conversions in frequency, overlapping subspectra in the baseband. This is an aliasing that cannot be undone. Surprisingly, however, when the sampling rate of the luminance signal is exactly twice the folding carrier frequency—i.e., exactly the Nyquist limit lowest sampling rate—the aliasing of the lower first-harmonic sideband of the sampling frequency into the baseband is no longer a problem, since this alias exactly repeats and reinforces the folded high-pass filter response in the baseband.

Figures 31, 32, 33, 34, 35, 36:
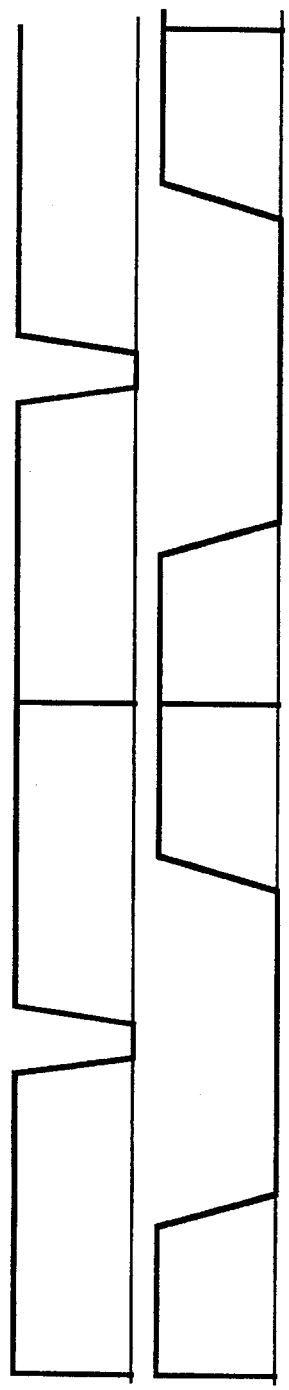
FIGS. 31–36 comprise a set of frequency spectra sharing the same axis of abscissas in frequency, which spectra are descriptive of video tape recorder electronics using folded luminance signals in which digitization is carried out at a rate three times the folding carrier frequency.

FIG. 31 depicts the frequency spectrum of a full-band luminance signal in which digitization is carried out at a rate twice a 5.1 MHz folding carrier frequency. In addition to the baseband subspectrum extending from zero to 5 MHz, there are subspectra that are first-harmonic sidebands of the 10.2 MHz luminance sampling carrier, the lower sideband extending down from 10.2 MHz to 5.2 MHz and the upper sideband extending up from 10.2 MHz to 15.2 MHz. There will also be sidebands flanking the higher harmonics of the sampling carrier, which additional subspectra are not of consequence here and are ignored.

FIG. 32 depicts the frequency spectrum of the response, of a digital low-pass filter with 2.55 MHz cut-off, to the FIG. 31 full-band luminance signal spectrum in which digitization is carried out at a rate twice the 5.1 MHz folding carrier frequency. In addition to the baseband subspectrum extending from zero to 2.55 MHz, there are subspectra that are first-harmonic sidebands of the 10.2 MHz luminance sampling carrier, the lower sideband extending down from 10.2 MHz to 7.65 MHz and the upper sideband extending up from 10.2 MHz to 12.75 MHz.

FIG. 33 depicts the frequency spectrum of the response, of a digital high-pass filter with 2.55 MHz cut-off, to the FIG. 31 full-band luminance signal spectrum in which digitization is carried out at a rate twice the 5.1 MHz folding carrier frequency. In addition to the baseband subspectrum extending from 2.55 to 5 MHz, there subspectra that are are first-harmonic sidebands of the 10.2 MHz luminance sampling carrier, the lower sideband extending down from 7.65 to 5.2 MHz and the upper sideband extending up from 12.75 to 15.2 MHz.

FIG. 34 depicts the frequency spectrum resulting from balanced modulation of a 5.1 MHz folding frequency carrier by the FIG. 33 digital high-pass filter response. The baseband subspectrum extending from 2.55 to 5 MHz is heterodyned by the 5.1 MHz folding frequency carrier to generate a reversed-spectrum lower sideband extending down from 2.55 to 0.1 MHz and to generate an upper sideband extending up from 7.65 to 10.1 MHz. The lower first-harmonic sideband extending down from 7.65 to 5.2 MHz is translated to generate a reversed-spectrum lower sideband extending down from 2.55 to 0.1 MHz; and the upper first-harmonic sideband extending up from 12.75 to 15.2 MHz is translated to generate a subspectrum extending up from 7.65 to 10.1 MHz. These aliases of the first-harmonic sidebands are identical to the result of folding the high-pass filter response baseband component. During playback, then, there is no need to separate these aliases from the result of folding the high-pass filter response baseband component and discard them.

FIG. 35 depicts the frequency spectrum resulting from adding the spectra of FIGS. 32 and 34. There are gaps in the FIG. 34 spectrum in the bands where the FIG. 33 high-pass filter responses reposed. These gaps are 2.5 MHz wide so that a low-pass filter with a cut-off frequency in the 2.55–5.1 MHz range is easily design to suppress the subspectra in the 5.2–10.1 MHz band and their harmonics.

FIG. 36 depicts the frequency spectrum resulting from low-pass filtering the FIG. 35 spectrum, the subspectra of which are converted to analog low-pass filter response by a digital-to-analog converter.

While the invention has been described with particular reference to the context of providing improved VHS recording, the invention provides solution to other problems concerning restricted-bandwidth media for the transmission of video information. For example, the invention can be useful in the tape recording of high-definition or extended-definition television signals, whether such recording is done on an analog basis or on a digital basis. In such embodiments of the invention, appropriate modifications are made to accommodate the use of progressive frame scanning rather than the scanning of interleaved scan fields in each frame.

What is claimed is:

1. Apparatus for processing a video signal that is raster scanned, with successive scan lines occurring at a prescribed scan line rate within image fields and occurring in first and second spatially interleaved sets of scan lines within each image field, said video signal being a baseband video signal of a prescribed bandwidth extending up to a prescribed maximum frequency, said apparatus comprising:

means for providing a sampled video signal by sampling said video signal;

a band-splitting filter with a crossover frequency of one-half said prescribed maximum frequency, responding to said sampled video signal for separating therefrom samples of a lower-frequency-band component and samples of a higher-frequency-band component of said sampled video signal;

means for generating first and second weighted sums of said lower-frequency-band component and said higher-frequency-band component, said lower-frequency-band component and said higher-frequency-band component both being weighted by a first weighting factor in generating said first weighted sum, and both being weighted by second weighting factors of the same amplitude but of opposite polarities in generating said second weighted sum; and means for selecting alternate samples of said first and second weighted sums to generate a folded-video signal.

2. Apparatus for processing a video signal as set forth in claim 1, wherein said means for generating a folded-video signal comprises:

a multiplexer responding to a control signal applied thereto for selecting between said first weighted sum and said second weighted sum to generate said folded-video signal;

a first exclusive-OR gate for generating a response to the oddness or evenness of the current frame and to the oddness or evenness of the current scan line expressed as logic conditions differing from each other; and a second exclusive-OR gate for generating said control signal in dependence upon reception of the response of said first exclusive-OR gate and to the oddness or evenness of the current sample expressed as logic conditions differing from each other.

3. Apparatus as set forth in claim 1, wherein said band-splitting filter comprises:

a digital horizontal lowpass filter connected to receive said sampled video signal, for providing said lower-frequency-band component of said sampled video signal as its horizontal lowpass filter response;

a digital horizontal high-pass filter connected to receive said sampled video signal, for providing said higher-frequency-band component of said sampled video signal as its horizontal high-pass filter response;

means for generating a factor that is diminished from a prescribed value in response to increase in the average value of said horizontal high-pass filter response;

a digital multiplier for multiplying said horizontal high-pass filter response to said sampled video signal by said factor.

4. Apparatus as set forth in claim 3, wherein said means for generating a factor that is diminished from a prescribed value in response to increase in the average value of said horizontal high-pass filter response comprises:

a memory storing a look-up table of factors to be selectively supplied one at a time to said digital multiplier as selected by a memory read addresses;

an absolute-value circuit responsive to said digital horizontal high-pass filter response for supplying a rectified horizontal high-pass filter response;

a digital lowpass filter for lowpass filtering said rectified horizontal high-pass filter response to generate said memory read addresses.

5. Apparatus as set forth in claim 3, wherein said digital horizontal lowpass filter comprises:

a tapped delay line connected to receive said sampled video signal and supply differentially delayed responses thereto from taps at one-sample intervals;

weight and sum circuitry for weighting said differentially delayed responses and summing the weighted responses to generate said horizontal lowpass filter response; and wherein said digital horizontal high-pass filter comprises, in addition to said tapped delay line and said weight and sum circuitry, a digital subtractor for differentially combining said horizontal lowpass filter response with a delayed sampled video signal as taken from a mid tap of said tapped delay line.

6. Apparatus as set forth in claim 1, wherein said means for sampling said video signal comprises an analog-to-digital converter for converting said video signal into said sampled video signal in response to a sampling clock at said Nyquist rate, and wherein said band-splitter filter is a digital filter responsive to said sampled video signal for providing both said lower-frequency-band component and said higher frequency-band component of said video signal in digital form.

7. Apparatus for processing a video signal that is raster scanned, with successive scan lines occurring at a prescribed scan line rate within image fields and occurring in first and second spatially interleaved sets of scan lines within each image field, said video signal being a baseband signal of a prescribed bandwidth extending up to a prescribed maximum frequency, said apparatus comprising:

means for providing a digitized video signal by digitizing said video signal;

a digital band-splitter filter with a cross-over frequency at one-half said prescribed maximum frequency, for separating said digitized video signal into samples of a lower-frequency-band component and samples of a higher-frequency-band component;

means for generating first and second weighted sums of said lower-frequency band component and said higher-frequency-band component, said lower-frequency-band component and said higher-frequency-band component both being weighted by a first weighting factor in generating said first weighted sum, and both being weighted by second weighting factors of the same amplitude but of opposite polarities in generating said second weighted sum; and means for selecting alternate samples of said first and second weighted sums to generate a folded-video signal.

8. Apparatus as set forth in claim 7, wherein said means for digitizing said video signal is of a type that digitizes said video signal regularly, at the Nyquist rate for said prescribed maximum frequency, generating two samples per cycle of said prescribed maximum frequency.

9. Apparatus as set forth in claim 7, wherein said means for selecting alternate samples of said first and second weighted sums to generate a folded-video signal is of a type for selecting zeroeth samples of said first weighted sum and first samples of said second weighted sum during scan lines in one of said first and second spatially interleaved sets and for selecting zeroeth samples of said second weighted sum and first samples of said first weighted sum during scan lines in the other one of said first and second spatially interleaved sets, as said first and second spatially interleaved sets respectively occur within each one of said image fields.

10. Apparatus as set forth in claim 8, included within a video recording machine.

11. Apparatus as set forth in claim 8, wherein at least certain ones of said image fields share a common locus for scan lines, said certain ones of said image fields that share a common locus for scan lines being identified by consecutive ordinal numbers modulo-two assigned in accordance with the successive occurrence of those image fields in time, and wherein said means for selecting alternate samples of said first and second weighted sums to generate a folded-video signal is of a type for selecting alternate samples of said first and second weighted sums in opposite sense during said zeroeth or even image fields than during said first or odd image fields.

12. Apparatus as set forth in claim 8, wherein said image fields occur in consecutive pairs having interleaved scan lines, the earlier image fields in said pairs sharing a common locus for scan lines and being identified by consecutive ordinal numbers modulo-two assigned in accordance with the successive occurrence of those earlier image fields in time, and the later image fields in said pairs sharing a common locus for scan lines and being identified by consecutive ordinal numbers modulo-two assigned in accordance with the successive occurrence of those earlier image fields in time; and wherein said means for selecting alternate samples of said first and second weighted sums is of a type for selecting alternate samples of said first and second weighted sums in opposite sense during said zeroeth or even image fields than during said first or odd image fields.

13. Apparatus as set forth in claim 8, wherein at least certain ones of said image fields share a common locus for scan lines, said certain ones of said image fields that share a common locus for scan lines being identified by consecutive ordinal numbers modulo-two assigned in accordance with the successive occurrence of those image fields in time; and wherein said means for selecting alternate samples of said first and second weighted sums is of a type for selecting alternate samples of said first and second weighted sums opposite sense during said zeroeth or even image fields than during said first or odd image fields, selecting alternate samples of said first and second weighted sums in opposite senses during scan lines in one of said first and second spatially interleaved sets, as said first and second spatially interleaved sets respectively occur within each one of said image fields.

14. Apparatus as set forth in claim 8, wherein said image fields occur in consecutive pairs having interleaved scan lines, the earlier image fields in said pairs sharing a common locus for scan lines and being identified by consecutive ordinal numbers modulo-two assigned in accordance with the successive occurrence of those earlier image fields in time, and the later image fields in said pairs sharing a common locus for scan lines and being identified by consecutive ordinal numbers modulo-two assigned in accordance with the successive occurrence of those earlier image fields in time; wherein said means for selecting alternate samples of said first and second weighted sums is of a type for selecting alternate samples of said first and second weighted sums in one sense during scan lines in said first spatially interleaved set and for selecting alternate samples of said first and second weighted sums in opposite sense during scan lines in said second spatially interleaved set, as said first and second spatially interleaved sets respectively occur within each one of said image fields, which type further selects alternate samples of said first and second weighted sums in opposite sense during said zeroeth or even image fields than during said first or odd image fields.

15. Apparatus as set forth in claim 7, wherein said digital band-splitting filter comprises:

a digital horizontal lowpass filter connected to receive said digitized video signal, for providing said lower-frequency-band component of said digitized video signal as its horizontal lowpass filter response;

a digital horizontal high-pass filter connected to receive said digitized video signal, for providing said higher-frequency-band component of said digitized video signal as its horizontal high-pass filter response;

means for generating a factor that is diminished from a prescribed value in response to increase in the average value of said horizontal high-pass filter response;

a digital multiplier for multiplying said horizontal high-pass filter response to said digitized video signal by said factor.

16. Apparatus for processing a video signal that is raster scanned with successive scan lines occurring at a prescribed scan line rate and being apportioned to first and second sets of scan lines, said video signal being a baseband signal of a prescribed bandwidth extending up to as high a frequency as a prescribed maximum frequency that is a multiple of said prescribed scan line rate, said apparatus comprising:

means for sampling said video signal at the Nyquist rate for said maximum frequency, whereby there is a prescribed integral number of sequential samples per scan line;

a band-splitter filter with a cross-over frequency at one-half said prescribed maximum frequency, for separating said video signal into a lower-frequency-band component and into a higher-frequency band component having a polarity associated with each of its successive samples, each component having said prescribed integral number of samples per scan line identified by consecutive modulo two numbers assigned in accordance with the sequential occurrence of those said samples beginning with zeroeth;

means for generating first and second weighted sums of said lower-frequency-band component and said higher-frequency-band component, said lower-frequency-band component being weighted by the same weighting factor in generating both said first and said second weighted sums, and said higher-frequency-band component being weighted by weighting factors of the same amplitude but of opposite polarities in generating said first and said second weighted sums; and means for generating a folded-video signal having said prescribed integral number of samples per scan line identified by consecutive modulo two numbers assigned in accordance with the sequential occurrence of said samples, during scan lines of said first set each zeroeth sample of said folded-video signal corresponding to the current zeroeth sample of said first weighted sum in magnitude and being of the same polarity, during scan lines of said first set each first sample of said folded-video signal corresponding to the current first sample of said second weighted sum, during scan lines of said second set each zeroeth sample of said folded-video signal corresponding to the current zeroeth sample of said second weighted sum and during scan lines of said second set each first sample of said folded-video signal corresponding to the current first sample of said first weighted sum.

17. Apparatus for processing a video signal as set forth in claim 16, wherein said video signal is representative of the luminance of a television image.

18. Apparatus for processing a video signal as set forth in claim 16, wherein said video signal is of the type wherein each successive frame thereof consists of a first field of scan lines followed by a second field of scan lines, the scan lines of each which second field are timed for interlacing with the scan lines of each which first field, the successive scan lines of each frame being of an odd number apportioned between the first and second fields of that said frame and being identified by consecutive ordinal numbers assigned in accordance with the order in which said scan lines occur in time beginning with the first, the successive frames of said video signal being identified by consecutive modulo two numbers assigned in accordance with the sequential occurrence of those said frames beginning with first; wherein said first set of scan lines includes the scan lines in the first field of each said first frame that are identified by odd ordinal number, the scan lines in the second field of each said first frame that are identified by even ordinal number, the scan lines in the first field of each said second frame that are identified by even ordinal number, and the scan lines in the second field of each said second frame that are identified by odd ordinal number; and wherein said second set of scan lines includes the scan lines in the first field of each said first frame that are identified by even ordinal number, the scan lines in the second field of each said first frame that are identified by odd ordinal number, the scan lines in the first field of each said second frame that are identified by odd ordinal number, and the scan lines in the second field of each said second frame that are identified by even ordinal number.

19. Apparatus for processing a video signal as set forth in claim 18, included within a video recording machine.

20. Apparatus for processing a video signal as set forth in claim 18, wherein said means for generating a folded-video signal comprises:

means for responding to said higher-frequency-band component to generate another higher-frequency-band component its negative in regard to polarity;

a first multiplexer for selecting one of said higher-frequency-band component and said another higher-frequency-band component its negative in regard to polarity in response to a first control signal;

a second multiplexer for selecting signals supplied from said first multiplexer in response to a second control signal; and a third multiplexer for selecting signals supplied from said second multiplexer in response to a third control signal, said first, second and third control signals being separate ones of a response to the oddness or evenness of the current frame, a response to the oddness or evenness of the current scan line, and a response to the oddness or evenness of the current sample; and means for combining said lower-frequency-band component of said video signal and the output response of said third multiplexer to generate said folded-video signal.

21. Apparatus as set forth in claim 20, wherein said means for sampling said video signal comprises an analog-to-digital converter for converting said video signal into said sampled video signal in response to a sampling clock at said Nyquist rate; wherein said band-splitter filter is a digital filter responsive to said sampled video signal for providing both said lower-frequency-band component and said higher-frequency-band component of said video signal in two's complement digital form; and wherein said means for responding to said higher-frequency-band component to generate another higher-frequency-band component its negative in regard to polarity essentially consists of:

a digital subtractor for subtracting from a minuend of two each sample of the higher-frequency-band component of said digitized video signal as those samples occur sequentially in time as a subtrahend, to generate a difference signal that in two's complement arithmetic supplies the negative of every sample of the higher-frequency-band component of said sampled video signal as those samples occur sequentially in time.

* * * * *